United States Patent [19]
Yoneyama et al.

[11] Patent Number: 5,347,399
[45] Date of Patent: Sep. 13, 1994

[54] ZOOM LENS SYSTEM

[75] Inventors: Shuji Yoneyama; Takayuki Sensui, both of Tokyo, Japan

[73] Assignee: Asahi Kogaku Kogyo Kabushiki Kaisha, Tokyo, Japan

[21] Appl. No.: 964,439

[22] Filed: Oct. 21, 1992

[30] Foreign Application Priority Data

Oct. 21, 1991 [JP] Japan ................................. 3-336414
Feb. 27, 1992 [JP] Japan ................................. 4-041138
Aug. 17, 1992 [JP] Japan ................................. 4-217764

[51] Int. Cl.$^5$ .......................................... G02B 15/14
[52] U.S. Cl. .................................. 359/690; 359/686; 359/687
[58] Field of Search ............... 359/687, 689, 690, 686

[56] References Cited

U.S. PATENT DOCUMENTS

| | | | |
|---|---|---|---|
| 4,350,416 | 9/1982 | Ishiyama | 359/687 |
| 4,462,664 | 7/1984 | Moskovich | 359/690 |
| 4,693,566 | 9/1987 | Imaizumi | 359/687 |
| 4,925,280 | 5/1990 | Hashimoto | 359/690 |
| 4,984,876 | 1/1991 | Hata et al. | 359/690 |
| 4,991,942 | 2/1991 | Fujibayashi et al. | 359/690 |

FOREIGN PATENT DOCUMENTS

| | | |
|---|---|---|
| 3803484 | 2/1988 | Fed. Rep. of Germany . |
| 60-214328 | 10/1985 | Japan . |
| 64-74520 | 3/1989 | Japan . |
| 64-79716 | 3/1989 | Japan . |
| 1201614 | 8/1989 | Japan . |
| 978816 | 12/1964 | United Kingdom . |
| 1229941 | 4/1971 | United Kingdom . |
| 1334972 | 10/1973 | United Kingdom . |
| 1475696 | 6/1977 | United Kingdom . |
| 2033604 | 10/1981 | United Kingdom . |
| 2072872 | 10/1981 | United Kingdom . |
| 2157016 | 1/1985 | United Kingdom . |

*Primary Examiner*—Scott J. Sugarman
*Attorney, Agent, or Firm*—Sughrue, Mion, Zinn, Macpeak & Seas

[57] ABSTRACT

A zoom lens system is disclosed which is fairly compact and easy to handle despite the fact that it has a constant overall lens length and which allows the first lens group to be moved by a sufficiently small amount during zooming to facilitate the adoption of automatic housing. The zoom lens system includes, in order from the object side, a first lens group having a positive power, a second lens group having a negative power and a third lens group having a positive power, the first lens group being fixed during zooming, the second and third lens groups being moved along the optical axis as zooming is effected, the system satisfying the following conditions (a) and (b):

$$0.8 < fW/f1 < 1.25 \qquad (a)$$

$$m2\,L < -1 < m2\,S \qquad (b)$$

where
fW: the focal length of the overall system at the wide-angle end;
$f1$: the focal length of the first lens group;
m2L: the magnification by the second lens group at the telephoto end; and
m2S: the magnification by the second lens group at the wide-angle end.

11 Claims, 18 Drawing Sheets

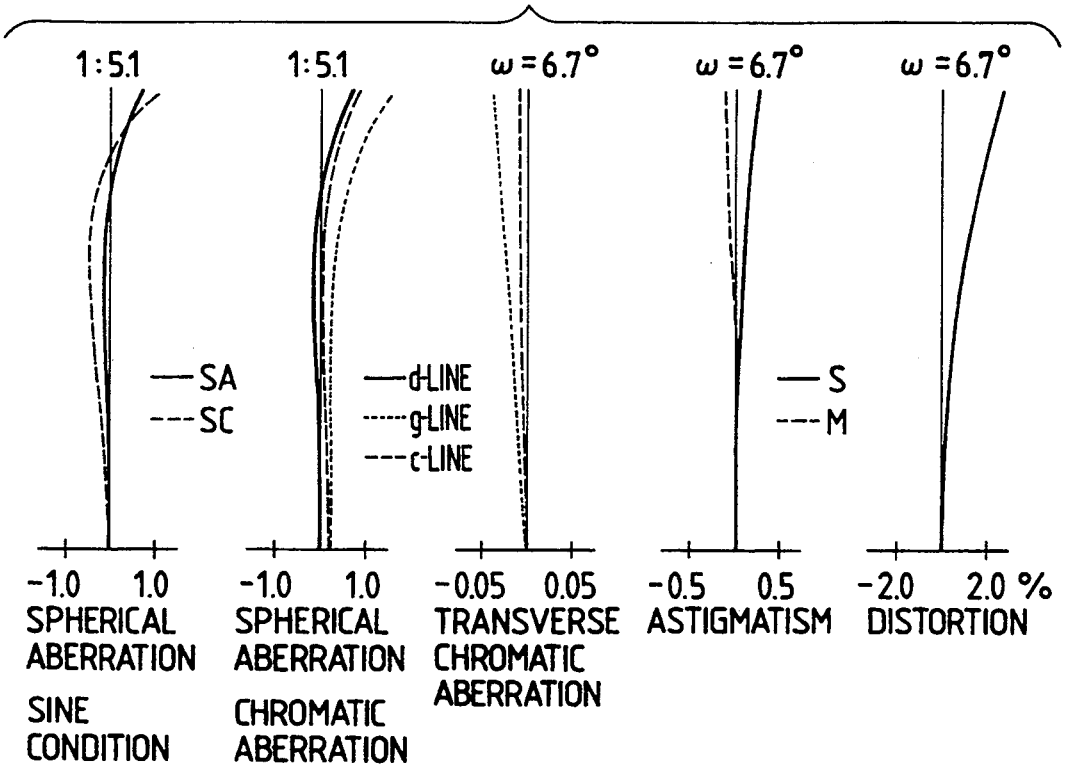
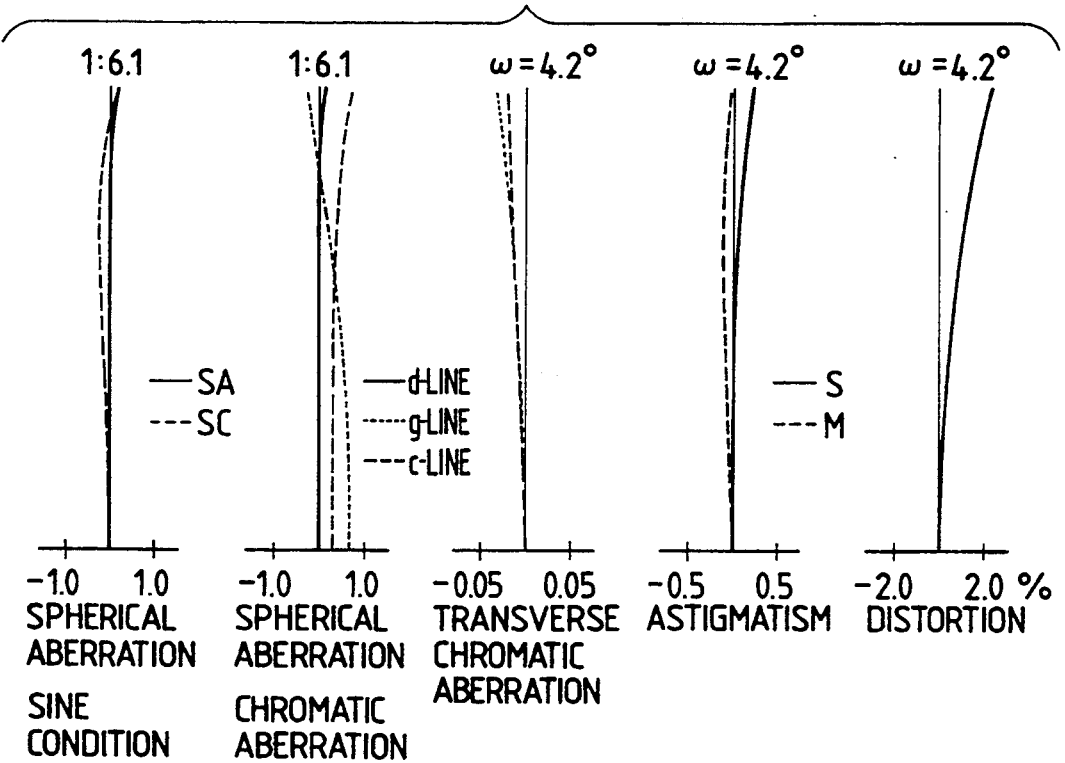

ZOOM LENS SYSTEM

BACKGROUND OF THE INVENTION

This application is based on and claims priority from Japanese Applications Nos. Hei. 3-336414, Hei. 4-41138 and Hei. 4-217764 filed Oct. 21, 1991, Feb. 27, 1992 and Aug. 17, 1992, respectively, the disclosures of which are incorporated by reference herein.

The present invention relates to a zoom lens system of a telephoto type that has a zoom ratio of about 3 and which is particularly suitable for use with single-lens reflex cameras.

Conventional zoom lens systems of a telephoto type are available as a four-group composition that comprises the first and fourth lens groups that are fixed during zooming, the second lens group that is moved for zooming along the optical axis, and the third lens group that is moved along the optical axis to correct any shift in the focal position due to zooming. In this case, the overall lens length can be held constant.

Another type of the four-group composition is such that the four lens groups are respectively movable along the optical axis during zooming in this case, variable magnification and other functions can be shared by the respective lens groups.

In order to further reduce the overall lens length of the type that has the first and fourth lens groups fixed during zooming, the refractive powers of the individual lens groups must be increased but this introduces difficulty in achieving effective correction of aberrations, thus making it difficult to realize a compact overall system.

With the second type which permits the four lens groups to be respectively moved along the optical axis during zooming, one can avoid the situation in which the refractive power of any particular lens group becomes excessive; however, the amount of movement of individual lens groups tends to increase. It is possible to reduce the overall lens length at the wide-angle end but, on the other hand, the overall lens length at the telephoto end will increase.

Stated more specifically, the amount of movement of individual lens groups tends to increase, causing problems with handling properties during zooming as exemplified by the front end of the lens hood making accidental contact with an object exterior to the lens system, as well as the center of gravity of the camera shifting in position by such a great amount as to cause difficulty in shooting.

Further, both types of zoom lens systems have had a common problem in that it is mechanically difficult to adopt automatic focusing since the first lens group has to be moved by a large amount.

An object, therefore, of the present invention is to provide a zoom lens system that is fairly compact and easy to handle despite the fact that it has a constant overall lens length and which requires the first lens group to be moved only by a sufficiently small amount during zooming to facilitate the adoption of automatic focusing.

SUMMARY OF THE INVENTION

The present invention attains this object by a zoom lens system comprising, in order from the object side, a first lens group having a positive power, a second lens group having a negative power and a =blEd lens group having a positive power, said Eirst lens group being fixed during zooming, said second and third lens groups being moved along the optical axis as zooming is effected, said system satisfying the following conditions (a) and (b):

$$0.8 < fW/f1 < 1.25 \quad (a)$$

$$m2L < -1 < m2S \quad (b)$$

where
- fW: the focal length of the overall system at the wide-angle end;
- f1: the focal length of the first lens group;
- m2L: the magnification by the second lens group at the telephoto end; and
- m2S: the magnification by the second lens group at the wide-angle end.

The system preferably satisfied the following condition (e):

$$80 < \nu 1p \quad (e)$$

where
- $\nu 1p$: the greatest value of the Abbe numbers of the positive lenses in the first lens group.

BRIEF DESCRIPTION OF THE DRAWINGS

FIG. 23 is another set of graphs plotting the aberration curves obtained with the zoom lens system of Example 6;

FIG. 24 is still another set of graphs plotting the aberration curves obtained with the zoom lens system of Example 6;

PREFERRED EMBODIMENTS OF THE INVENTION

Figure 1:
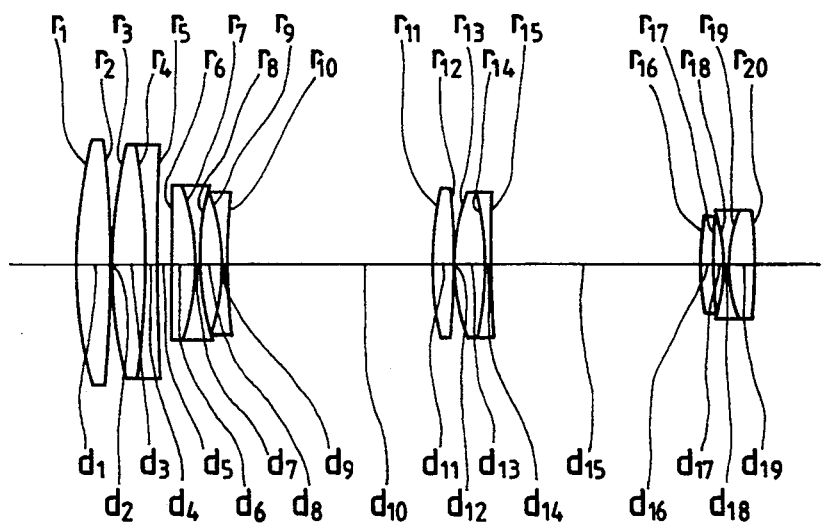
FIG. 1 is a simplified cross-sectional view of the zoom lens system according to Example 1 at the wide-angle end.

Examples of the zoom lane system of the present invention are described below with reference to the accompanying drawings.

Each of the zoom lens systems according to the examples of the present invention which are described hereinafter is one of a telephoto type that comprises, in order from the object side, a first lens group having a positive power, a second lens group having a negative power and a third lens group having a positive power.

The first lens group is fixed during zooming whereas the second and third lens groups are movable along the optical axis as zooming is effected. By satisfying the following conditions (a) and (b), the zoom lens system of the present invention sets the powers of the respective lens groups appropriately and, at the same time, it sees the zoom ratios of the second and third lens groups appropriately so that the overall lens length is held constant and the overall system is rendered compact:

$$0.8 < fW/f1 < 1.25 \tag{a}$$

$$m2L < -1 < m2S \tag{b}$$

where
- fW: the focal length of the overall system at the wide-angle end;
- f1: the focal length of the first lens group;
- m2L: the magnification by the second lens group at the telephoto end; and
- m2S: the magnification by the second lens group at the wide-angle end.

Condition (a) relates to the power of the first lens group.

When designing a compact zoom lens system, the powers of the individual lens groups will generally increase. In the case of a telephoto type zoom lens system, the power of the first lens group will increase.

Exceeding the upper limit of condition (a) is favorable for the purpose of realizing a compact zoom lens system but, on the other hand, aberrations that occur in the first lens group, in particular, the spherical aberration that occurs at the telephoto end when focusing for near distance will be undercorrected. If the lower limit of condition (a) is not reached, not only does it become difficult to realize a compact system but also the first lens group has to be moved by a large amount to achieve focusing.

Condition (b) relates to the magnification by the second lens group. If the magnifications by the second lens group at the telephoto and wide-angle ends are set to lie within the range specified by condition (b), the second lens group will zoom from the wide-angle to the telephoto end with size-for-size being included within the zooming range and this contributes to a smaller movement of the third lens group during zooming.

In short, the direction of movement of the third lens group can be reversed at the position where the magnification by the second lens group is equivalent to life size. This arrangement permits the third lens group to reciprocate between the wide-angle and telephoto ends during zooming, whereby a compact zoom lens system can be provided with the overall lens length being held constant.

The third lens group satisfies the following condition (c):

$$m3L < m3S < -1.0 \qquad (c)$$

where
m3L: the magnification by the third lens group at the telephoto end; and
m3S: the magnification by the third lens group at the
m3S: wide-angle end.

Condition (c) relates to the magnification by the third lens group.

If the second lens group is made chiefly responsible for performing the zooming action, its power becomes so great as to introduce difficulty in effectively correcting the aberrations that will occur in it. If, on the other hand, the power of the second lens group is not increased, the amount by which the second lens group has to be moved during zooming becomes so great as to introduce difficulty in reducing the overall length of the system.

Under these circumstances, the third lens group is designed to zoom from the wide-angle to telephoto end in such a way as to satisfy condition (c); in other words, the variable magnification by the third lens group is increased over the range greater than life size, and this is effective in causing the second and third lens groups to share the zooming action.

In this way, part of the zooming action is shared by the third lens group and, as a result, the power of the second lens group is set appropriately and the amount of its movement is sufficiently reduced to shorten the overall length of the zoom lens system.

Each of the zoom lens systems according to the examples under consideration further satisfies the following condition (d):

$$0.3 < Z3/Z2 < 0.9$$

where
Z2: the zoom ratio of the second lens group; and
Z3: the zoom ratio of the third lens group.

Condition (d) specifies the ratio between the zoom ratios of the second and third lens groups so that they will share the zooming action in appropriate proportions.

If the upper limit of condition (d) is exceeded, the zoom ratio of the third lens group becomes too high to insure that it need be moved by only a small amount during zooming. If the lower limit of condition (d) is not reached, the zoom ratio of the second lens group becomes very high and its power becomes so strong that the aberrations occurring in it cannot be easily corrected.

If only the zoom ratio of the second lens group is increased without increasing its power, the amount by which the second lens group has to be moved during zooming becomes so great as to introduce difficulty in reducing the overall lens length.

To insure that more preferred results can be attained, the first lens group in each of the zoom lens system according to the examples under discussion comprises, in order from the object side, a first sub-group 1-1 having a positive power, a second sub-group 1-2 having a positive power, and a third sub-group 1-3 having a negative power.

The second lens group comprises, in order from the object side, a first sub-group 2-1 having a positive power, with a convex surface of strong curvature being oriented toward the image plane, that is cemented with a biconcave second sub-group 2-2, and a third sub-group 2-3 having a negative power with a concave surface of strong curvature being oriented toward the object.

The third lens group comprises, in order from the object side, a sub-group 3a having a positive power and a subgroup 3b having a negative power and it is so designed that the distance between said sub-groups 3a and 3b is varied as zooming is effected.

This arrangement insures that the variation in astipmatism that occurs during zooming and the spherical aberration that occurs at middle focal distance can be corrected more effectively.

Further, sub-group 3a of the third lens group comprises, in order from the object side, a first lens element 3a-1 having a positive power, and a second lens element 3a-2 having a positive power that is cemented with a third lens element 3a-3 having a negative power.

Sub-group 3b of the third lens group comprises, in order from the object side, a first lens element 3b-1 having a positive power, with a convex surface of large curvature being oriented toward the object, and a biconcave second lens element 3b-2 that is cemented with a third lens element 3b-3 having a positive power.

Also, it is possible to arrange a sub-lens group, having. a small refractive power,.on the image side in the third lens group. In this case, if a negative sub-lens group is arranged therein, it ks possible to reduce the overall size of the system. On the other hand, a positive sub-lens group is arranged therein, it is possible to suppress the various aberrations although the overall length would be increased relative to the case where the negative sub-lens group is arranged in the third lens group.

Condition (e) relates to the dispersive power by the positive lenses in the first lens group- If at least one positive lens in the fire lens group satisfies this condition, chromatic aberrations, in particular, axial chromatic aberration that occurs at the telephoto end can be effectively corrected.

In the telephone zoom lens systems of the examples under consideration, the third lens group comprises, in order from the object side, a positive first sub-group 3a and a negative second sub-group 3b and satisfies the following condition (f):

$$80 < \nu 3p \qquad (f)$$

where
$\nu 3p$: the Abbe number of the positive lens in the sub-group 3a.

If a low dispersing glass is used only in the first lens group, the axial chromatic aberration that occurs at the telephoto end can be effectively corrected but, on the other hand, it is difficult to correct the chromatic aberration, in particular, lateral chromatic aberration that occurs at the wide-angle end. The chromatic aberrations that will occur at the wide-angle end can be effectively corrected if a low dispersing glass that satisfies condition (f) is also used in the third lens group.

Examples 1 to 9 of the zoom lens system of the present invention are described below with reference to data sheets, in which f denotes the focal length, fB the back focus, r the radius of curvature of an individual lens surface, d the lens thickness or the airspace between lenses (the foregoing parameters are in millimeters), FNO. the f number, ω the half view angle (in degrees), n the refractive index of an individual lens at the d-line, and ν the Abbe number of an individual lens at the d-line.

EXAMPLE 1

Figure 2:
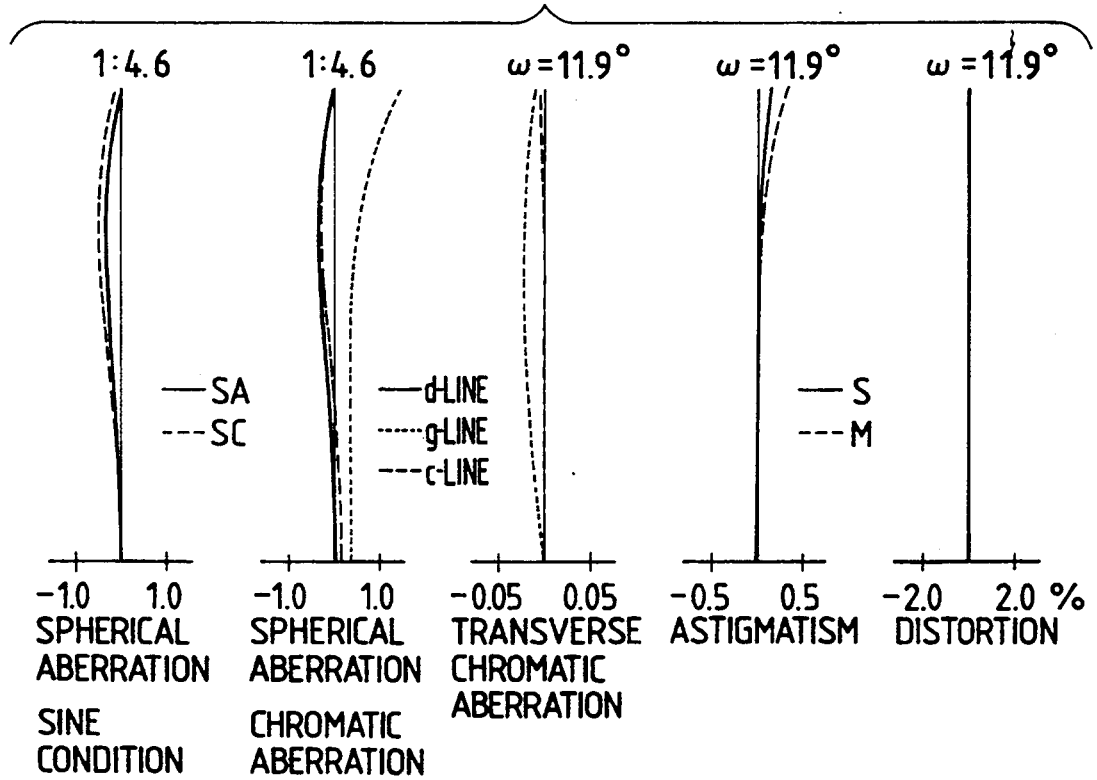
FIG. 2 is a set of graphs plotting the aberration curves obtained with the zoom lens system of Example 1.
Figure 3:
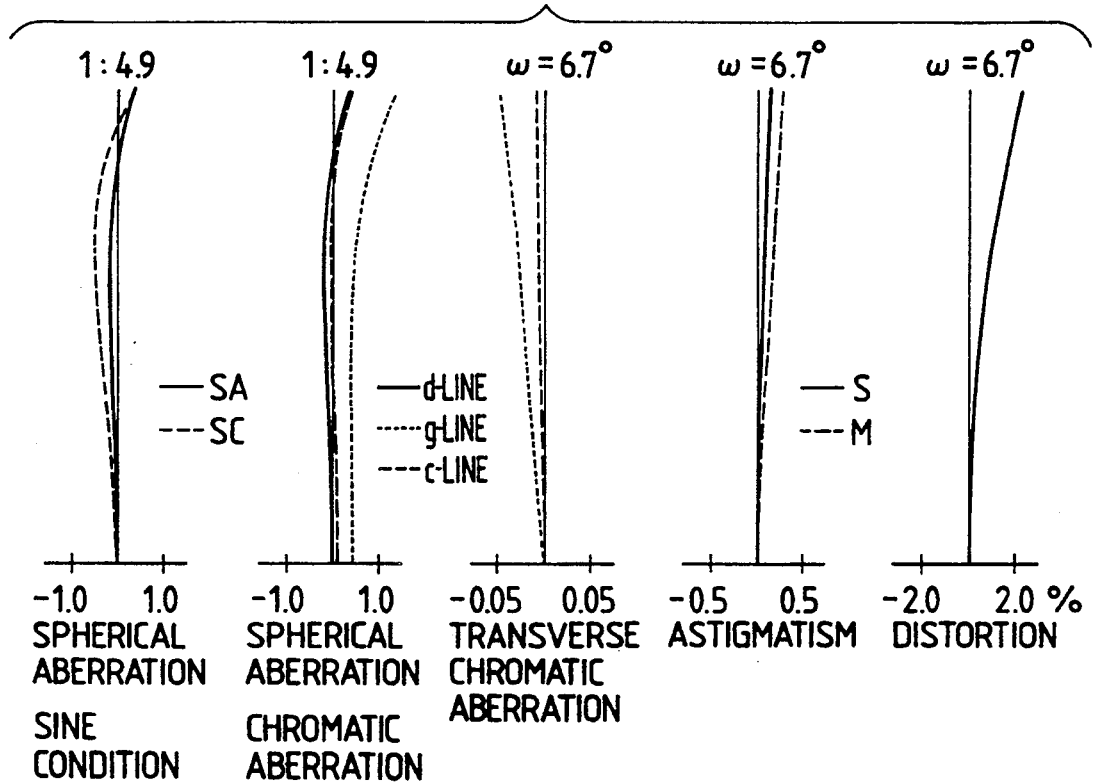
FIG. 3 is another set of graphs plotting the aberration curves obtained with the zoom lens system of Example 1.
Figure 4:
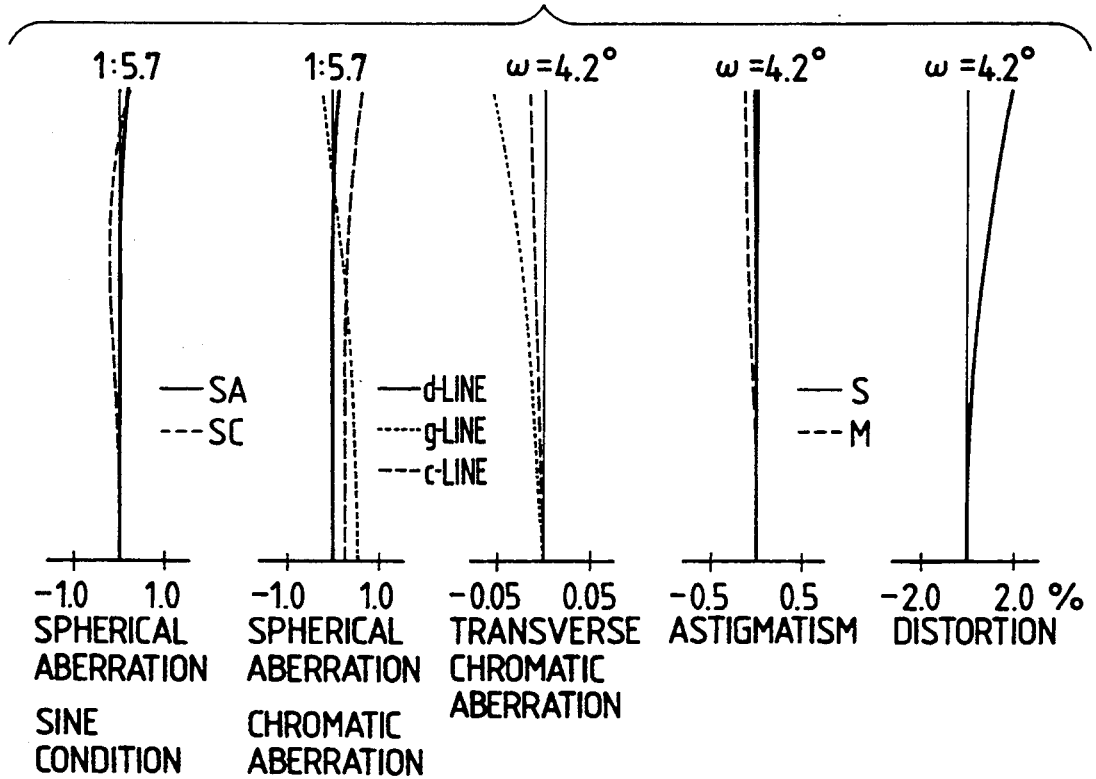
FIG. 4 is still another set of graphs plotting the aberration curves obtained with the zoom lens system of Example 1.

FIG. 1 is a simplified cross-sectional view of the zoom lens system according to Example 1 at the wide-angle end. Specific data for this example are as shown in Table 1. The aberration curves obtained with this lens system are plotted in FIGS. 2, 3 and 4.

TABLE 1

| Surface No. | r | d | n | ν |
|---|---|---|---|---|
| 1 | 88.800 | 7.65 | 1.51633 | 64.1 |
| 2 | −206.849 | 0.20 | | |
| 3 | 96.900 | 7.40 | 1.48749 | 70.2 |
| 4 | −148.000 | 2.50 | 1.80518 | 25.4 |
| 5 | 872.500 | variable | | |
| 6 | 624.975 | 5.25 | 1.80518 | 25.4 |
| 7 | −42.418 | 1.50 | 1.69680 | 55.5 |
| 8 | 55.710 | 4.46 | | |
| 9 | −49.497 | 1.50 | 1.77250 | 49.6 |
| 10 | 186.723 | variable | | |
| 11 | 61.254 | 5.00 | 1.60311 | 60.7 |
| 12 | −120.000 | 0.20 | | |
| 13 | 41.721 | 6.30 | 1.48749 | 70.2 |
| 14 | −73.562 | 1.50 | 1.80518 | 25.4 |
| 15 | 257.881 | 45.96 | | |
| 16 | 46.580 | 2.90 | 1.53172 | 48.9 |
| 17 | 340.800 | 1.99 | | |
| 18 | −31.819 | 1.50 | 1.80610 | 40.9 |
| 19 | 31.819 | 5.00 | 1.76182 | 26.5 |
| 20 | −118.500 | | | |

The values of FNO. f, fB, ω, d5 and d10 vary with zooming as shown in Table 2 below.

TABLE 2

| FNo. | 4.6 | 4.9 | 5.7 |
|---|---|---|---|
| f | 103.00 | 180.00 | 290.00 |
| fB | 48.85 | 53.73 | 68.48 |
| ω | 11.9 | 6.7 | 4.2 |
| d5 | 3.00 | 18.65 | 24.68 |
| d10 | 44.28 | 23.75 | 2.97 |

EXAMPLE 2

Figure 5:
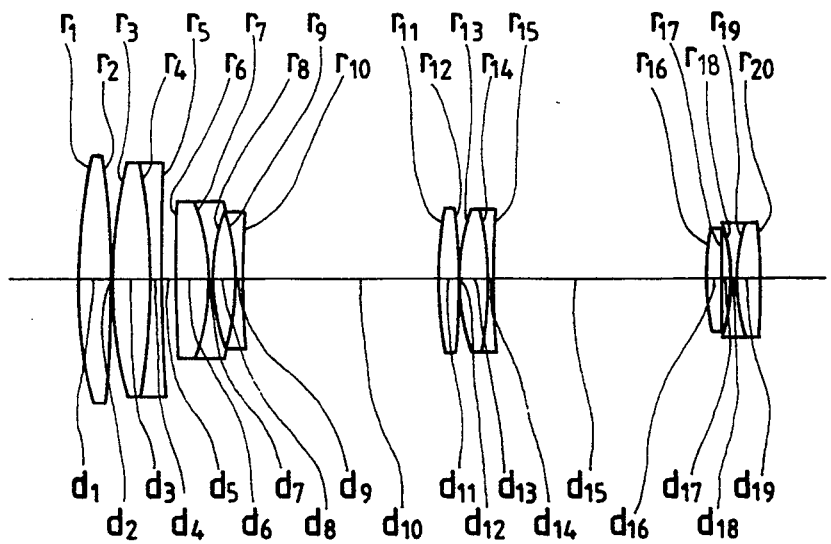
FIG. 5 is a simplified cross-sectional view of the zoom lens system according to Example 2 at the wide-angle end.
Figure 6:
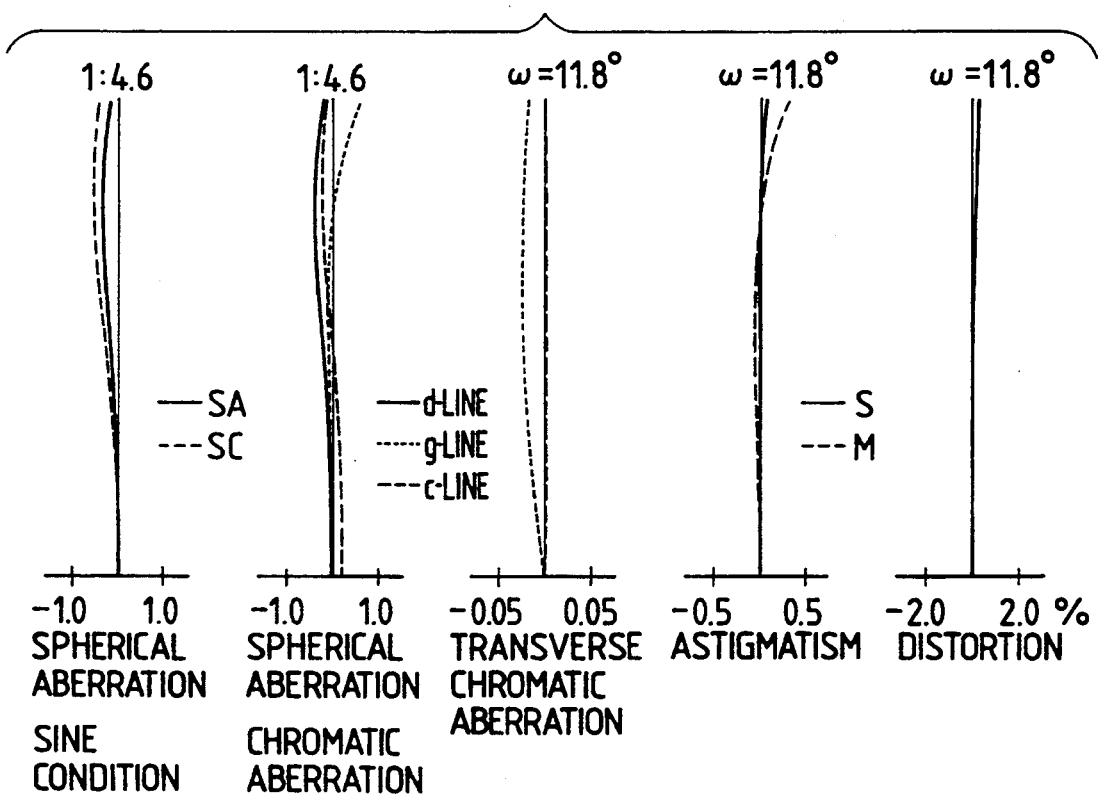
FIG. 6 is a set of graphs plotting the aberration curves obtained with the zoom lens system of Example 2.
Figure 7:
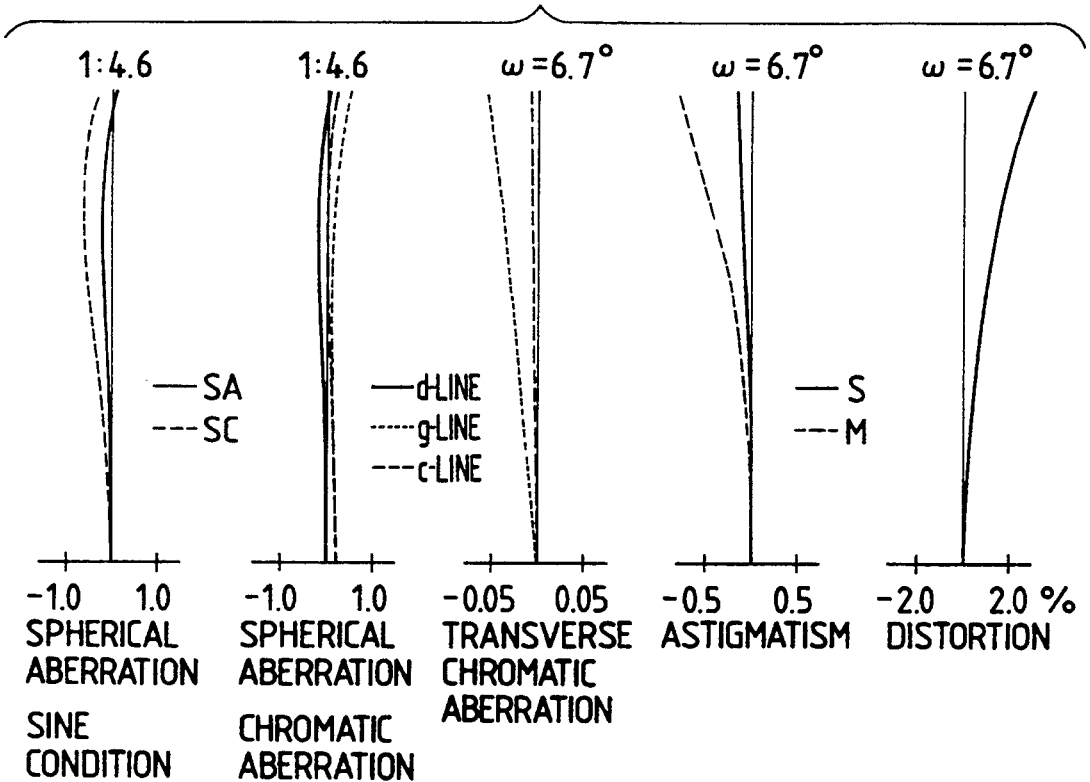
FIG. 7 is another set of graphs plotting the aberration curves obtained with the zoom lens system of Example 2.
Figure 8:
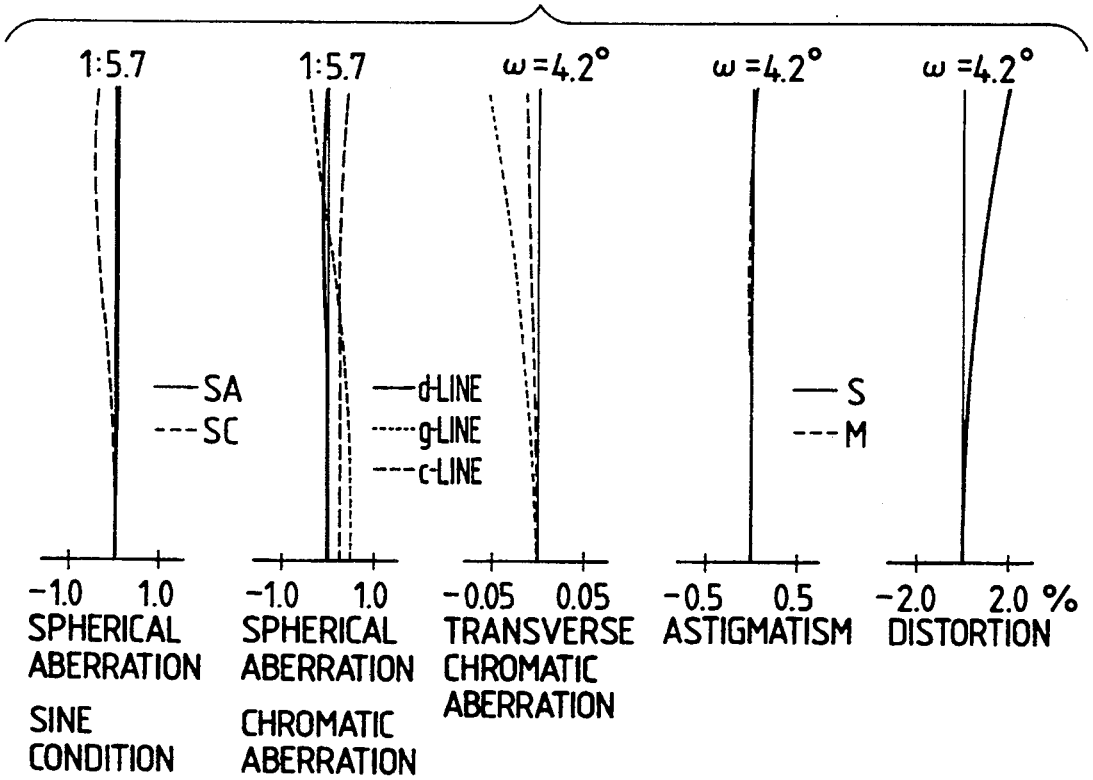
FIG. 8 is still another set of graphs plotting the aberration curves obtained with the zoom lens system of Example 2.

FIG. 5 is a simplified cross-sectional view of the zoom lens system according to Example 2 at the wide-angled end. Specific data for this example are as shown in Table 3. The aberration carvers obtained with this lens system are plotted in FIGS. 6, 7 and 8.

TABLE 3

| Surface No. | r | d | n | ν |
|---|---|---|---|---|
| 1 | 88.429 | 7.53 | 1.58913 | 61.2 |
| 2 | −227.793 | 0.20 | | |
| 3 | 88.881 | 8.05 | 1.48749 | 70.2 |
| 4 | −155.392 | 2.50 | 1.80518 | 25.4 |
| 5 | 387.921 | variable | | |
| 6 | 303.035 | 6.86 | 1.80518 | 25.4 |
| 7 | −45.166 | 1.50 | 1.69680 | 55.5 |
| 8 | 45.166 | 4.64 | | |
| 9 | −45.166 | 1.50 | 1.77250 | 49.6 |
| 10 | 231.781 | variable | | |
| 11 | 67.813 | 4.55 | 1.62299 | 58.1 |
| 12 | −121.199 | 0.20 | | |
| 13 | 40.705 | 5.96 | 1.48749 | 70.2 |
| 14 | −79.360 | 1.50 | 1.80518 | 25.4 |
| 15 | 259.905 | 46.55 | | |
| 16 | 43.799 | 3.19 | 1.51742 | 52.4 |

TABLE 3-continued

| Surface No. | r | d | n | ν |
|---|---|---|---|---|
| 17 | 861.507 | 1.86 | | |
| 18 | −34.528 | 1.50 | 1.77250 | 49.6 |
| 19 | 34.528 | 4.81 | 1.68893 | 31.1 |
| 20 | −130.016 | | | |

The values of FNO., f, fB, ω, d5 and d10 vary with zooming as shown in Table 4 below.

TABLE 4

| FNo. | 4.6 | 4.9 | 5.7 |
|---|---|---|---|
| f | 103.01 | 180.00 | 290.00 |
| fB | 49.99 | 55.66 | 70.09 |
| ω | 11.8 | 6.7 | 4.2 |
| d5 | 3.00 | 16.85 | 22.50 |
| d10 | 42.61 | 23.08 | 3.00 |

EXAMPLE 3

Figure 9:
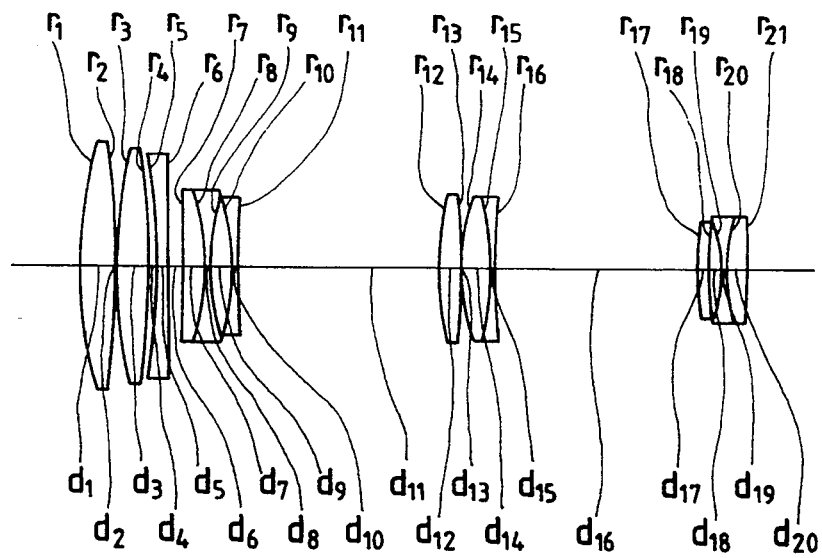
FIG. 9 is a simplified cross-sectional view of the zoom lens system according to Example 3 at the wide-angle end.
Figure 10:
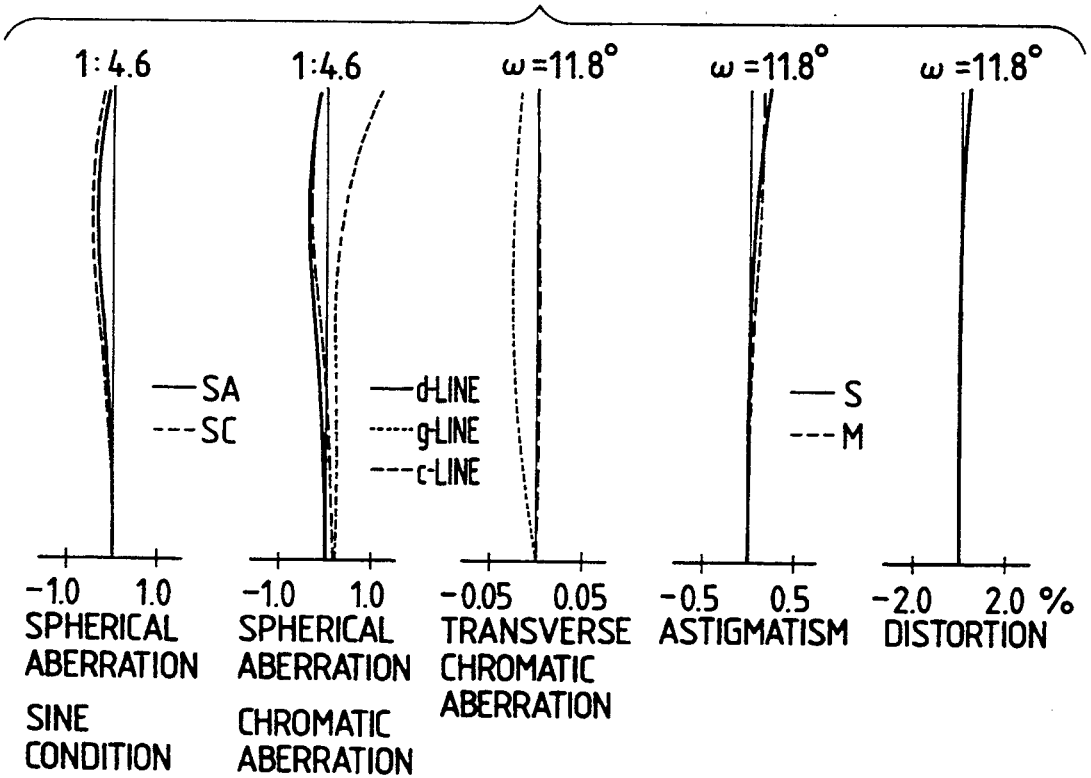
FIG. 10 is a set of graphs plotting the aberration curves obtained with the zoom lens system of Example 3.
Figure 11:
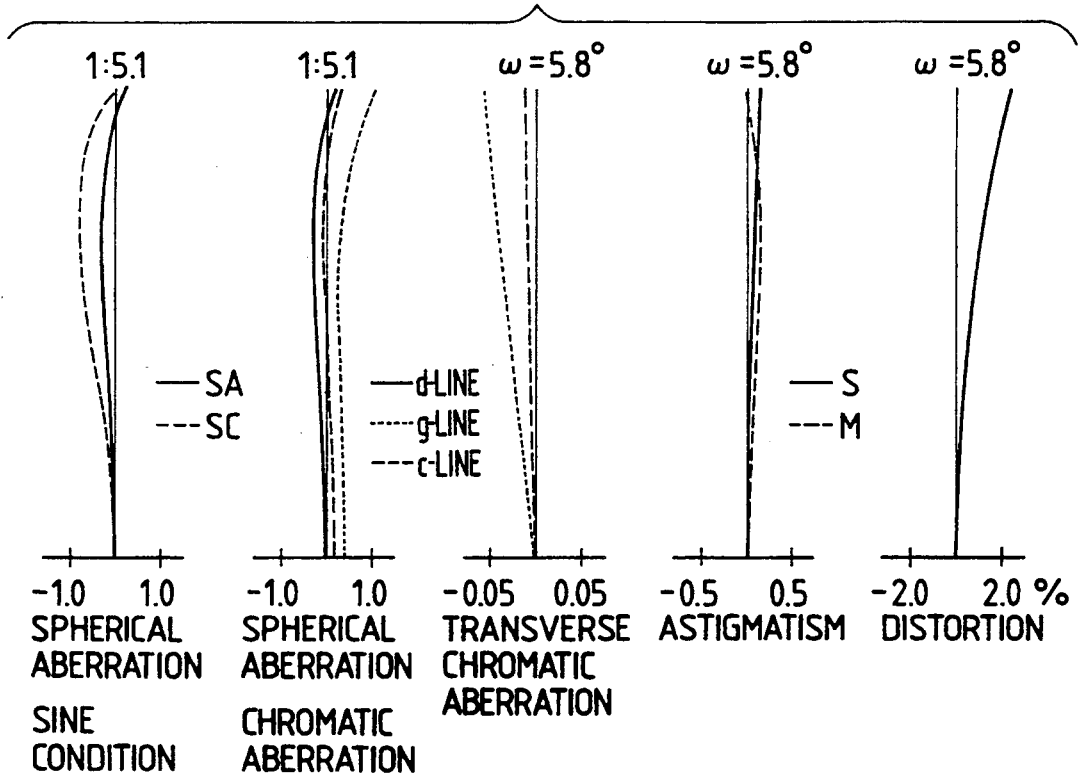
FIG. 11 is another set of graphs plotting the aberration curves obtained with the zoom lens system of Example 3.
Figure 12:
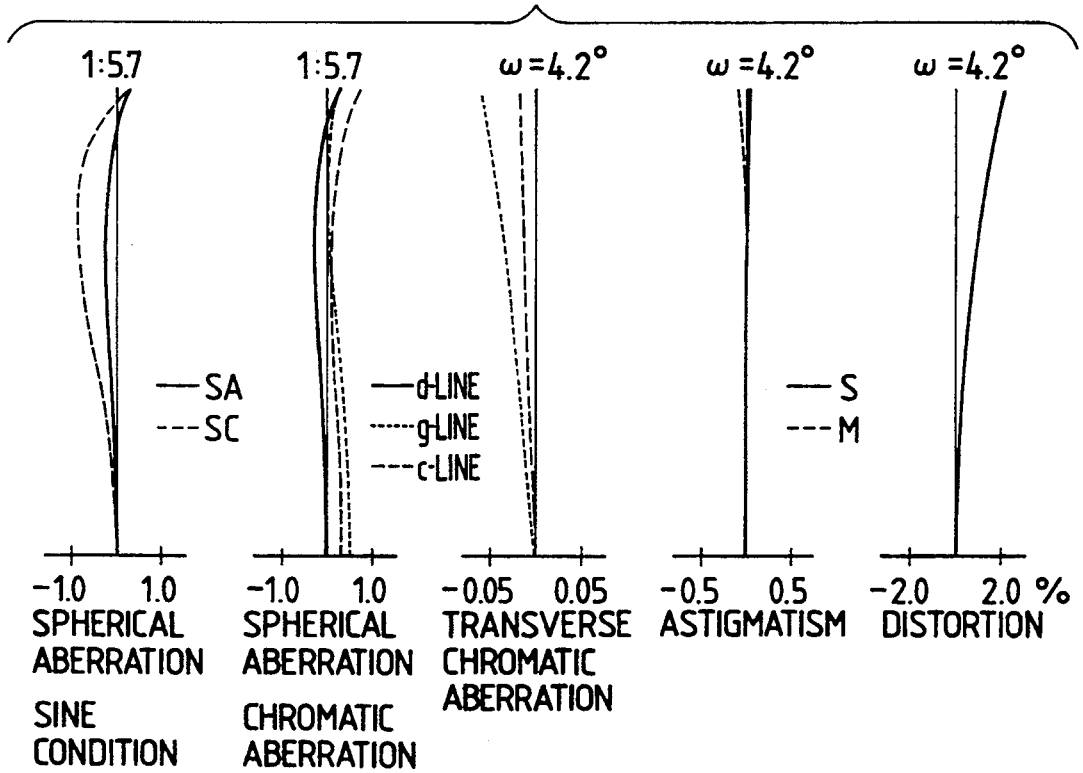
FIG. 12 is still another set of graphs plotting the aberration curves obtained with the zoom lens system of Example 3.

FIG. 9 is a simplified cross-sectional view of the zoom lens system according to Example 3 at the wide-angle end. Specific data for this example are as shown in Table 5. The aberration carvers obtained with this lens system are plotted in FIGS. 10, 11 and 12.

TABLE 5

| Surface No. | r | d | n | ν |
|---|---|---|---|---|
| 1 | 80.506 | 8.03 | 1.51633 | 64.1 |
| 2 | −187.913 | 0.20 | | |
| 3 | 104.658 | 6.68 | 1.48749 | 70.2 |
| 4 | −170.111 | 1.80 | | |
| 5 | −136.031 | 2.30 | 1.80518 | 25.4 |
| 6 | 976.036 | variable | | |
| 7 | 500.974 | 5.06 | 1.80518 | 25.4 |
| 8 | −44.147 | 1.50 | 1.69680 | 55.5 |
| 9 | 52.192 | 4.41 | | |
| 10 | −46.818 | 1.50 | 1.77250 | 49.6 |
| 11 | 241.997 | variable | | |
| 12 | 56.851 | 4.88 | 1.60311 | 60.7 |
| 13 | −135.202 | 0.20 | | |
| 14 | 41.396 | 6.00 | 1.48749 | 70.2 |
| 15 | −75.589 | 1.50 | 1.80518 | 25.4 |
| 16 | 225.333 | variable | | |
| 17 | 47.815 | 2.93 | 1.58144 | 40.8 |
| 18 | 343.172 | 2.05 | | |
| 19 | −30.524 | 1.50 | 1.80610 | 40.9 |
| 20 | 38.653 | 4.20 | 1.76182 | 26.5 |
| 21 | −95.907 | | | |

The values of FNO., f, fB, ω, d6 and d11 and d16 vary with zooming as shown in Table 6 below.

TABLE 6

| FNo. | 4.6 | 5.1 | 5.7 |
|---|---|---|---|
| f | 103.00 | 210.00 | 289.96 |
| fB | 51.68 | 60.89 | 70.69 |
| ω | 11.8 | 5.8 | 4.2 |
| d6 | 3.00 | 19.97 | 23.73 |
| d11 | 44.31 | 17.28 | 3.00 |
| d16 | 43.90 | 44.74 | 45.46 |

EXAMPLE 4

Figure 13:
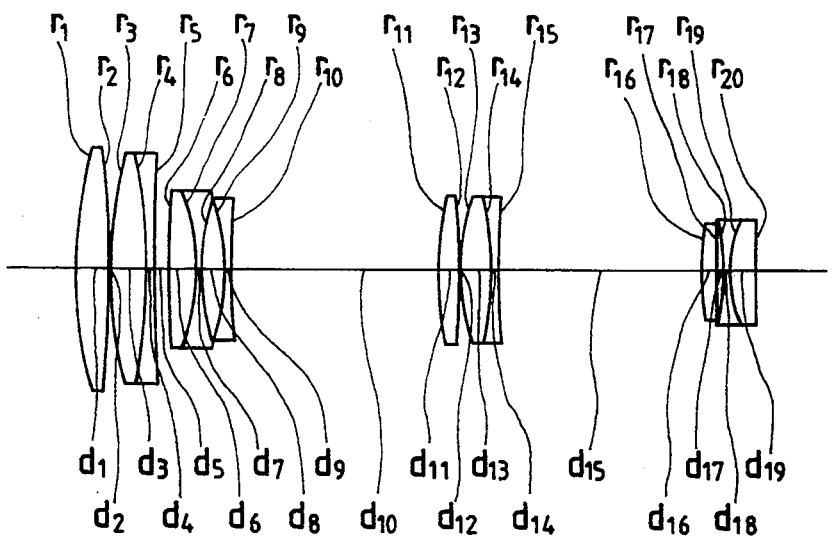
FIG. 13 is a simplified cross-sectional view of the zoom lens system according to Example 4 at the wide-angle end.
Figure 14:
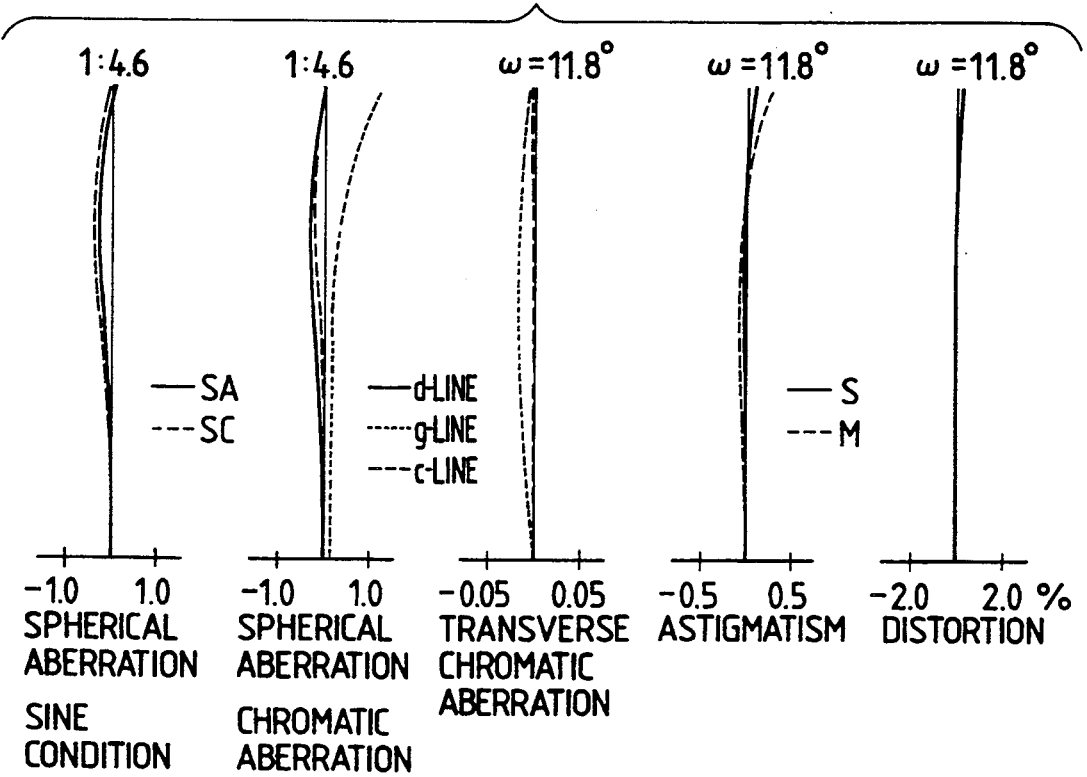
FIG. 14 is a set of graphs plotting the aberration curves obtained with the zoom lens system of Example 4.
Figure 15:
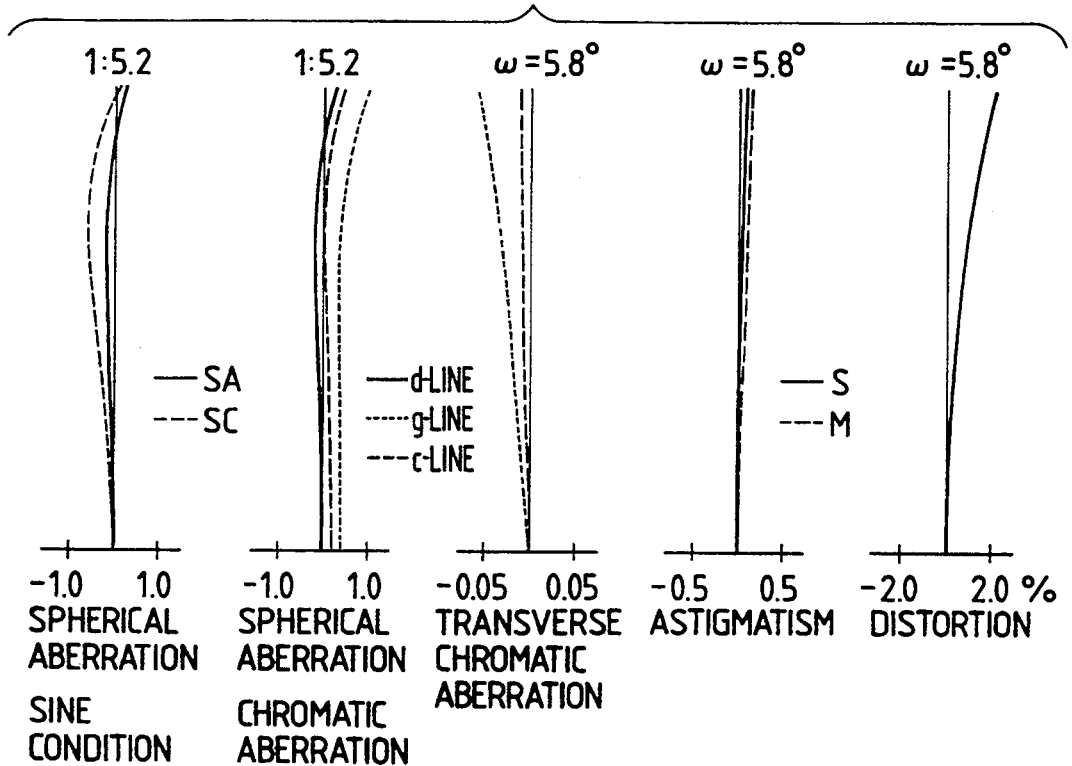
FIG. 15 is another set of graphs plotting the aberration curves obtained with the zoom lens system of Example 4.
Figure 16:
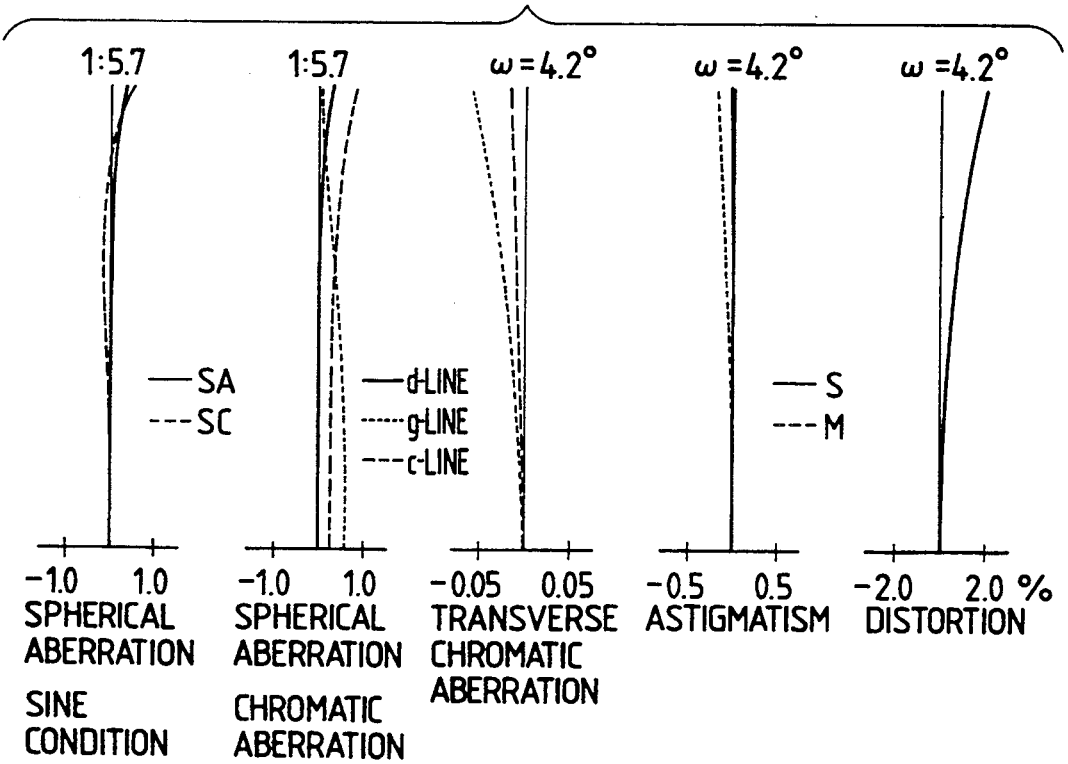
FIG. 16 is still another set of graphs plotting the aberration curves obtained with the zoom lens system of Example 4.

FIG. 13 is a simplified cross-sectional view of the zoom lens system according to Example 4 at the wide-angle end. Specific data for this example are shown in Table 7. The aberration curvers obtained with this lens system are plotted in FIGS. 14, 15 and 16.

TABLE 7

| Surface No. | r | d | n | v |
|---|---|---|---|---|
| 1 | 84.196 | 7.84 | 1.51633 | 64.1 |
| 2 | −185.956 | 0.20 | | |
| 3 | 87.664 | 7.57 | 1.48749 | 70.2 |
| 4 | −138.657 | 2.00 | 1.80518 | 25.4 |
| 5 | 620.418 | variable | | |
| 6 | 284.917 | 5.64 | 1.80518 | 25.4 |
| 7 | −43.889 | 1.50 | 1.69680 | 55.5 |
| 8 | 47.880 | 4.88 | | |
| 9 | −45.106 | 1.50 | 1.77250 | 49.6 |
| 10 | 203.517 | variable | | |
| 11 | 60.579 | 5.07 | 1.60311 | 60.7 |
| 12 | −124.527 | 0.20 | | |
| 13 | 43.029 | 6.37 | 1.48749 | 70.2 |
| 14 | −73.674 | 2.10 | 1.80518 | 25.4 |
| 15 | 280.501 | variable | | |
| 16 | 43.422 | 3.15 | 1.56732 | 42.8 |
| 17 | −867.177 | 1.61 | | |
| 18 | −36.610 | 1.50 | 1.83400 | 37.2 |
| 19 | 24.326 | 5.11 | 1.80518 | 25.4 |
| 20 | −1355.819 | | | |

The values of FNO., f, fB, ω, d5 and d10 and d15 vary with zooming as shown in Table 8 below.

TABLE 8

| FNo. | 4.6 | 5.2 | 5.7 |
|---|---|---|---|
| f | 103.00 | 210.00 | 289.79 |
| fB | 50.48 | 61.17 | 71.09 |
| ω | 11.8 | 5.8 | 4.2 |
| d5 | 3.00 | 17.96 | 21.58 |
| d10 | 45.13 | 18.44 | 4.50 |
| d15 | 44.72 | 45.75 | 46.14 |

EXAMPLE 5

Figure 17:
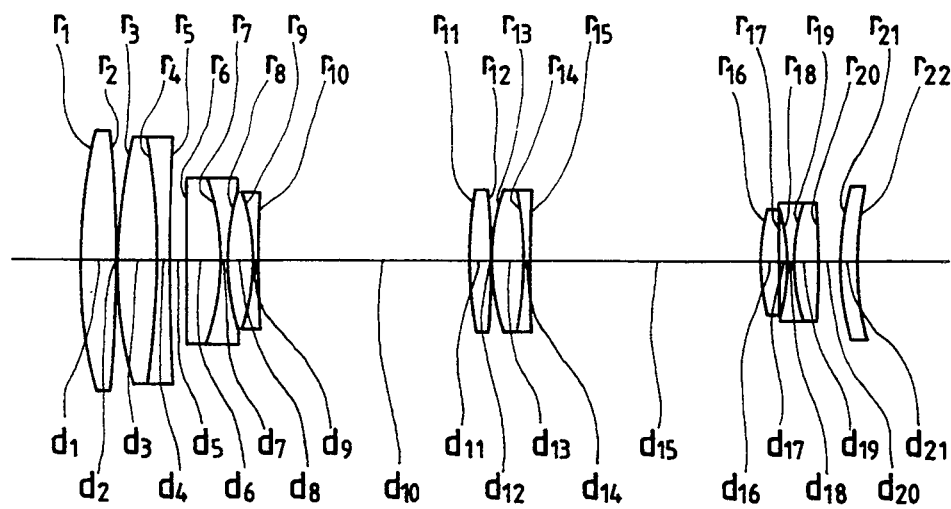
FIG. 17 is a simplified cross-sectional view of the zoom lens system according to Example 5 at the wide-angle end.
Figure 18:
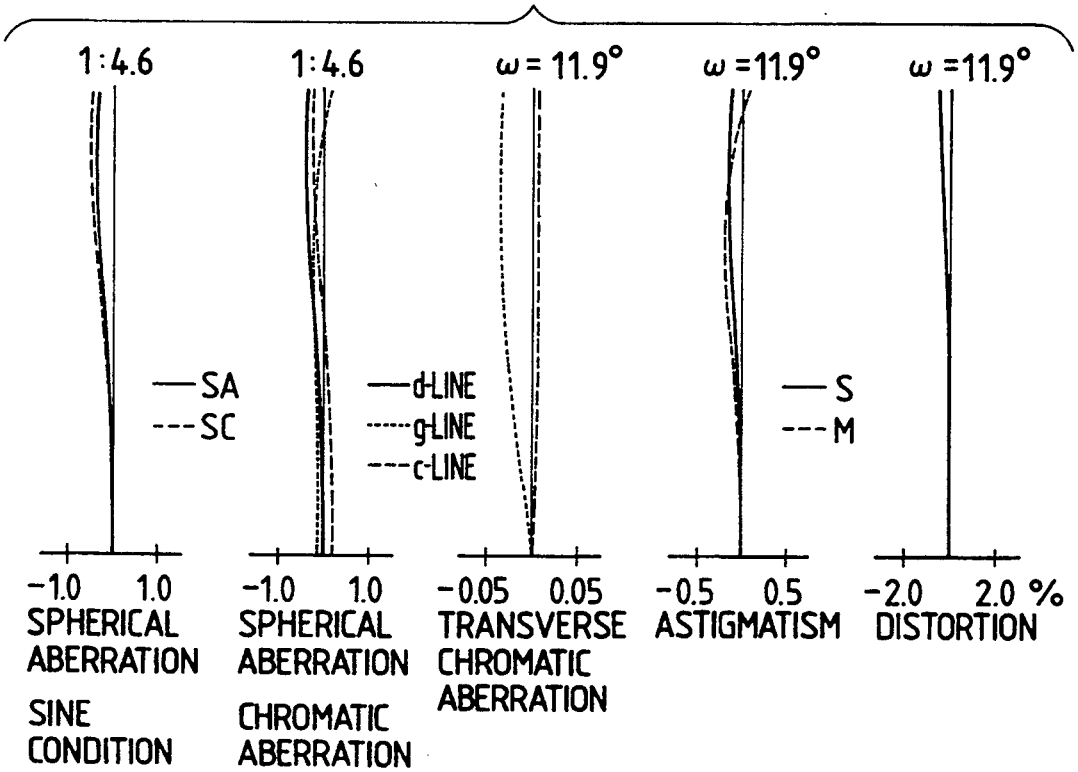
FIG. 18 is a set of graphs plotting the aberration curves obtained with the zoom lens system of Example 5.
Figure 19:
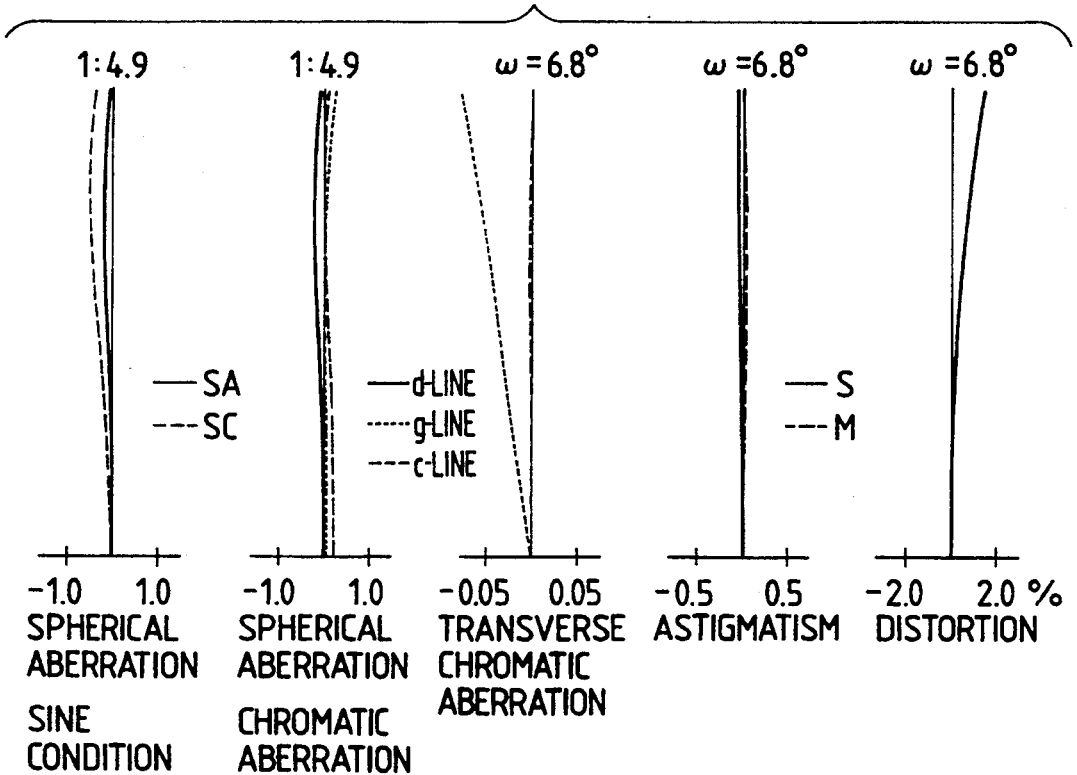
FIG. 19 is another set of graphs plotting the aberration curves obtained with the zoom lens system of Example 5.
Figure 20:
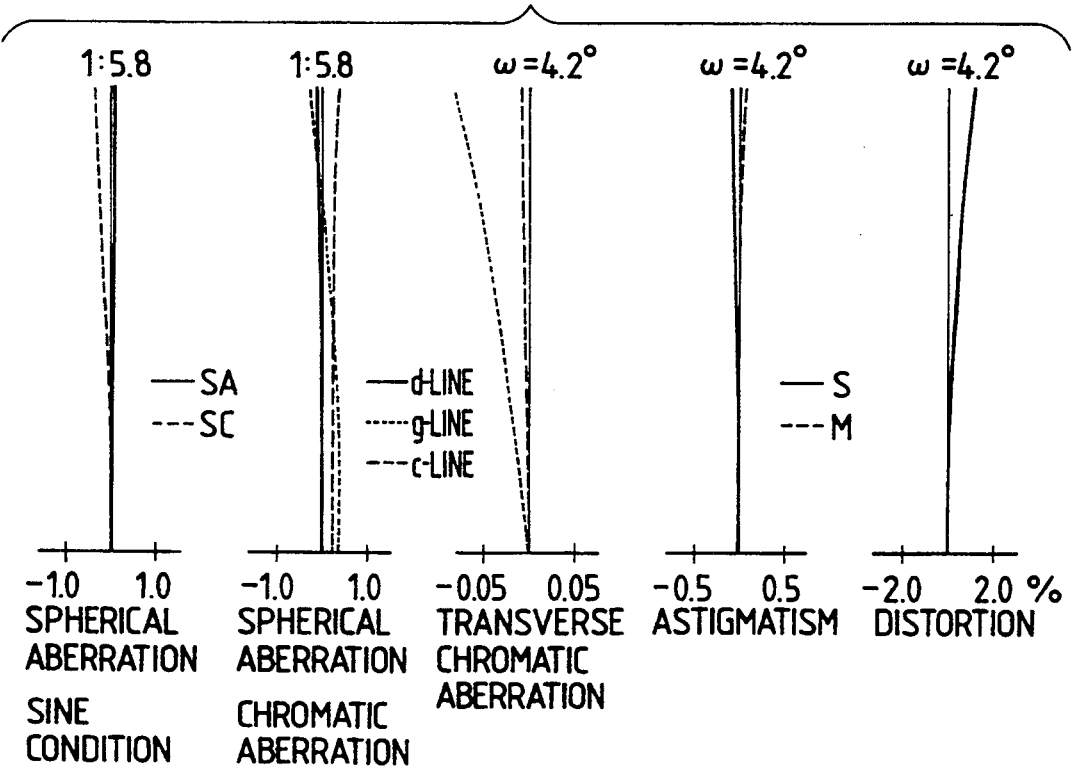
FIG. 20 is still another set of graphs plotting the aberration curves obtained with the zoom lens system of Example 5.

FIG. 17 is a simplified cross-sectional view of the zoom lens system according to Example 5 at the wide-angle end. Specific data for this example are shown in Table 9. The aberration curves obtained with this lens system are plotted in FIGS. 18, 19 and 20.

TABLE 9

| Surface No. | r | d | n | v |
|---|---|---|---|---|
| 1 | 97.272 | 8.28 | 1.58913 | 61.2 |
| 2 | −250.572 | 0.22 | | |
| 3 | 97.769 | 8.86 | 1.48749 | 70.2 |
| 4 | −170.931 | 2.75 | 1.80518 | 25.4 |
| 5 | 426.713 | variable | | |
| 6 | 333.338 | 7.55 | 1.80518 | 25.4 |
| 7 | −49.683 | 1.65 | 1.69680 | 55.5 |
| 8 | 49.683 | 5.11 | | |
| 9 | −49.683 | 1.65 | 1.77250 | 49.6 |
| 10 | 254.959 | variable | | |
| 11 | 74.594 | 5.01 | 1.62299 | 58.1 |
| 12 | −133.319 | 0.22 | | |
| 13 | 44.776 | 6.56 | 1.48749 | 70.2 |
| 14 | −87.296 | 1.65 | 1.80518 | 25.4 |
| 15 | 285.895 | 51.21 | | |
| 16 | 48.179 | 3.51 | 1.51742 | 52.4 |
| 17 | 947.658 | 2.05 | | |
| 18 | −37.981 | 1.65 | 1.77250 | 49.6 |
| 19 | 37.981 | 5.30 | 1.68893 | 31.1 |
| 20 | −143.018 | variable | | |
| 21 | 55.000 | 4.00 | 1.51633 | 64.1 |
| 22 | 64.484 | | | |

The values of FNO., f, fB, ω, d5, d10 and d20 are changed as shown in Table 10 below.

TABLE 10

| FNo. | 4.6 | 4.9 | 5.8 |
|---|---|---|---|
| f | 103.00 | 180.00 | 290.00 |
| fB | 41.92 | 41.92 | 41.92 |
| ω | 11.9 | 6.8 | 4.2 |
| d5 | 3.30 | 18.53 | 24.76 |
| d10 | 46.87 | 25.39 | 3.29 |
| d20 | 5.00 | 11.24 | 27.12 |

EXAMPLE 6

Figure 21:
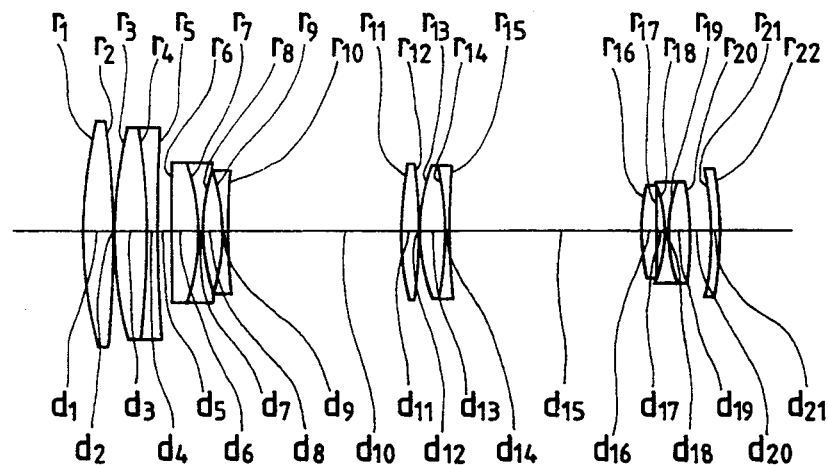
FIG. 21 is a simplified cross-sectional view of the zoom lens system according to Example 6 at the wide-angle end.
Figure 22:
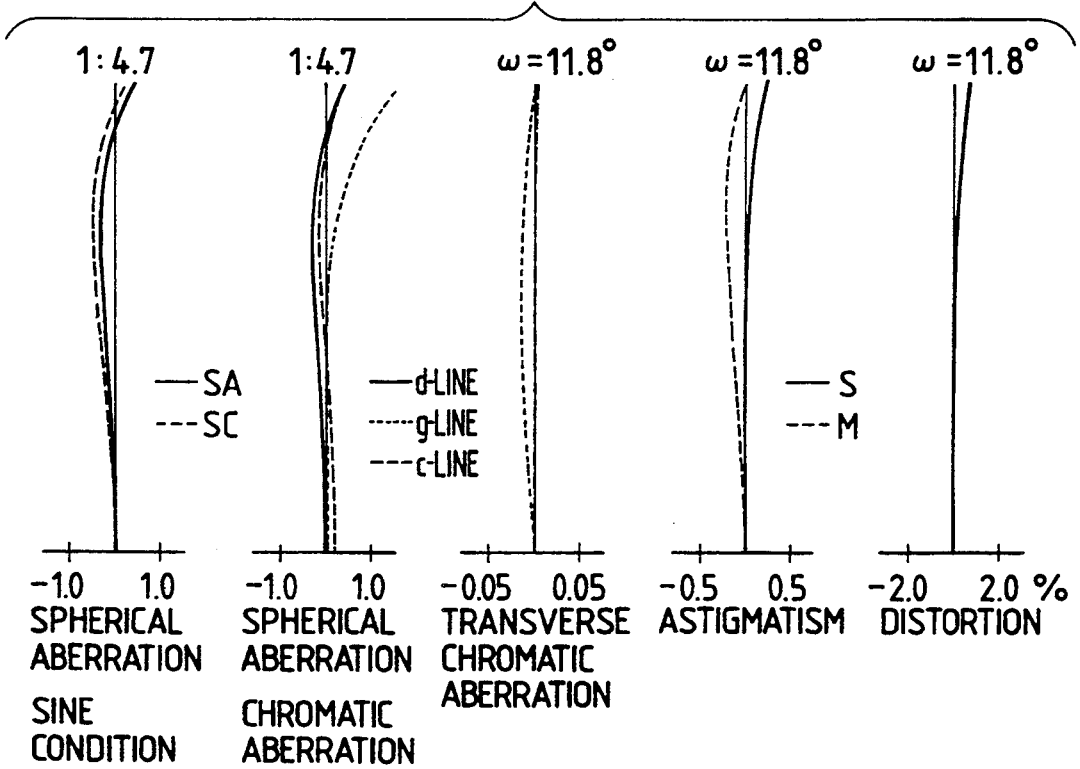
FIG. 22 is a set of graphs plotting the aberration curves obtained with the zoom lens system of Example 6.

FIG. 21 is a simplified cross-sectional view of the zoom lens system according to Example 6 at the wide-angle end. Specific data for this example are shown in Table 11. The aberration curves obtained with this kebs system are plotted in FIGS. 22, 23 and 24.

TABLE 11

| Surface No. | r | d | n | v |
|---|---|---|---|---|
| 1 | 79.586 | 6.78 | 1.58913 | 61.2 |
| 2 | −205.014 | 0.18 | | |
| 3 | 79.993 | 7.25 | 1.48749 | 70.2 |
| 4 | −139.853 | 2.25 | 1.80518 | 25.4 |
| 5 | 349.129 | variable | | |
| 6 | 272.731 | 6.18 | 1.80518 | 25.4 |
| 7 | −40.649 | 1.35 | 1.69680 | 55.5 |
| 8 | 40.649 | 4.18 | | |
| 9 | −40.649 | 1.35 | 1.77250 | 49.6 |
| 10 | 208.603 | variable | | |
| 11 | 61.032 | 4.10 | 1.62299 | 58.1 |
| 12 | −109.079 | 0.18 | | |
| 13 | 36.634 | 5.36 | 1.48749 | 70.2 |
| 14 | −71.424 | 1.35 | 1.80518 | 25.4 |
| 15 | 233.914 | 41.90 | | |
| 16 | 39.419 | 2.87 | 1.51742 | 52.4 |
| 17 | 775.356 | 1.68 | | |
| 18 | −31.075 | 1.35 | 1.77250 | 49.6 |
| 19 | 31.075 | 4.33 | 1.68893 | 31.1 |
| 20 | −117.014 | variable | | |
| 21 | −70.000 | 1.50 | 1.51633 | 64.1 |
| 22 | −104.027 | | | |

The values of FNO., f, fB, ω, d5, d10 and d20 are changed as shown in Table 12 below.

TABLE 12

| FNo. | 4.7 | 5.1 | 6.1 |
|---|---|---|---|
| f | 103.00 | 180.00 | 290.00 |
| fB | 43.66 | 43.66 | 43.66 |
| ω | 11.8 | 6.7 | 4.2 |
| d5 | 2.70 | 15.16 | 20.25 |
| d10 | 38.34 | 20.77 | 2.69 |
| d20 | 5.00 | 10.11 | 23.09 |

EXAMPLE 7

Figure 25:
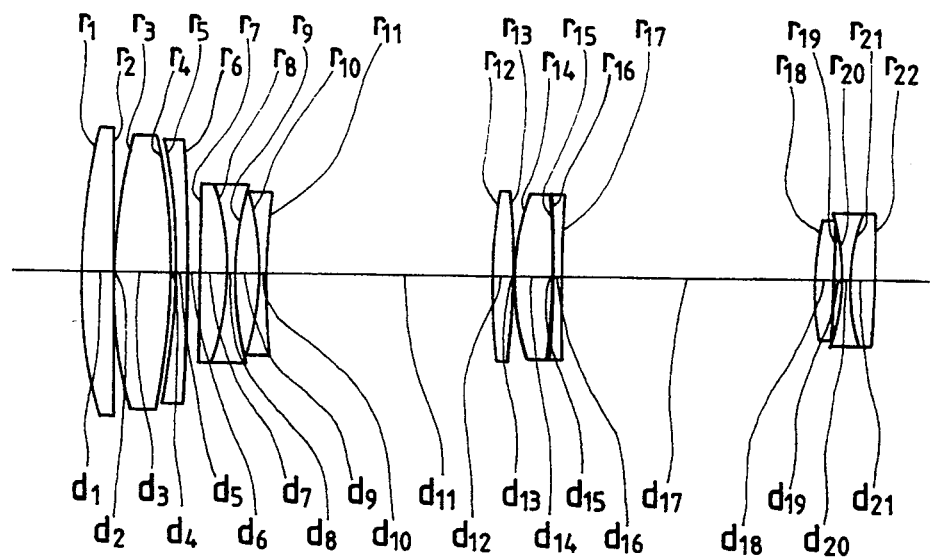
FIG. 25 is a simplified cross-sectional view of the zoom lens system according to Example 7 at the wide-angle end.
Figure 26:
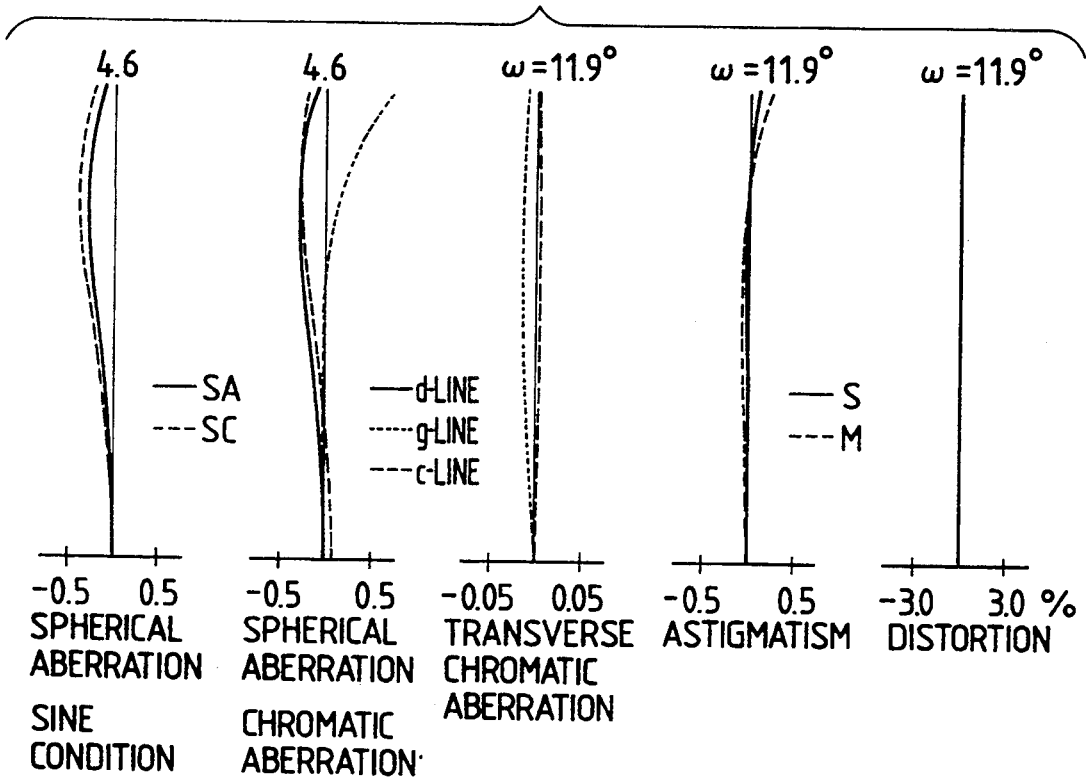
FIG. 26 is a set of graphs plotting the aberration curves obtained with the zoom lens system of Example 7.
Figure 27:
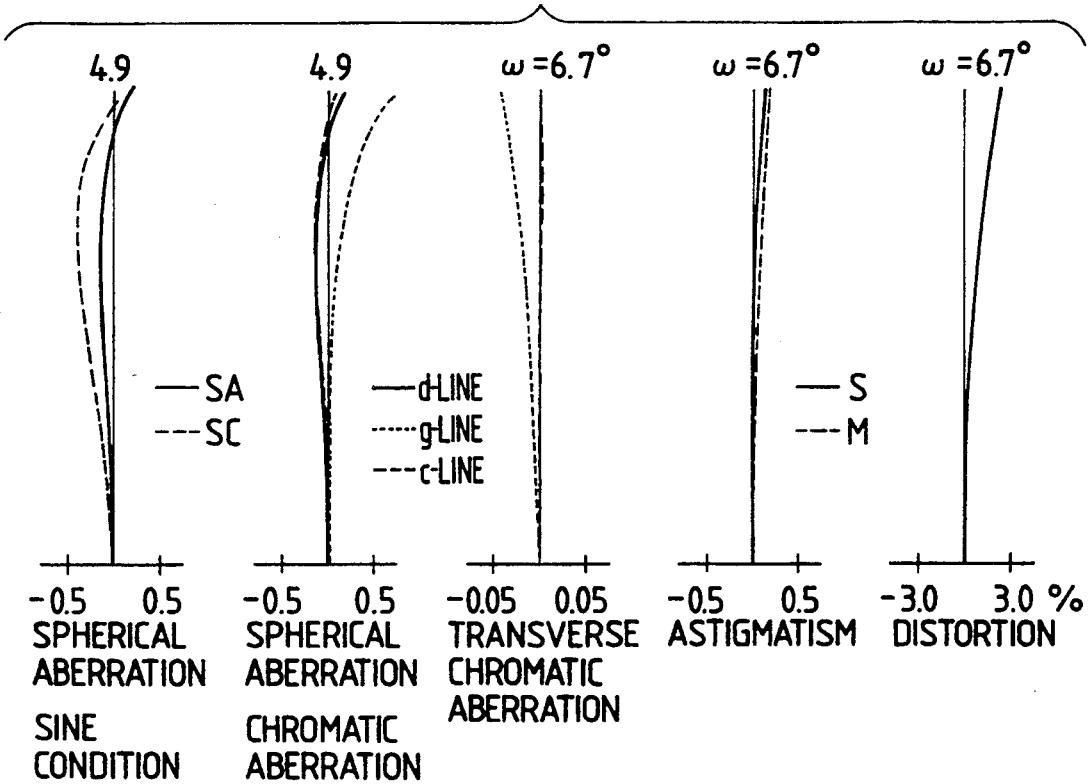
FIG. 27 is another set of graphs plotting the aberration curves obtained with the zoom lens system of Example 7.
Figure 28:
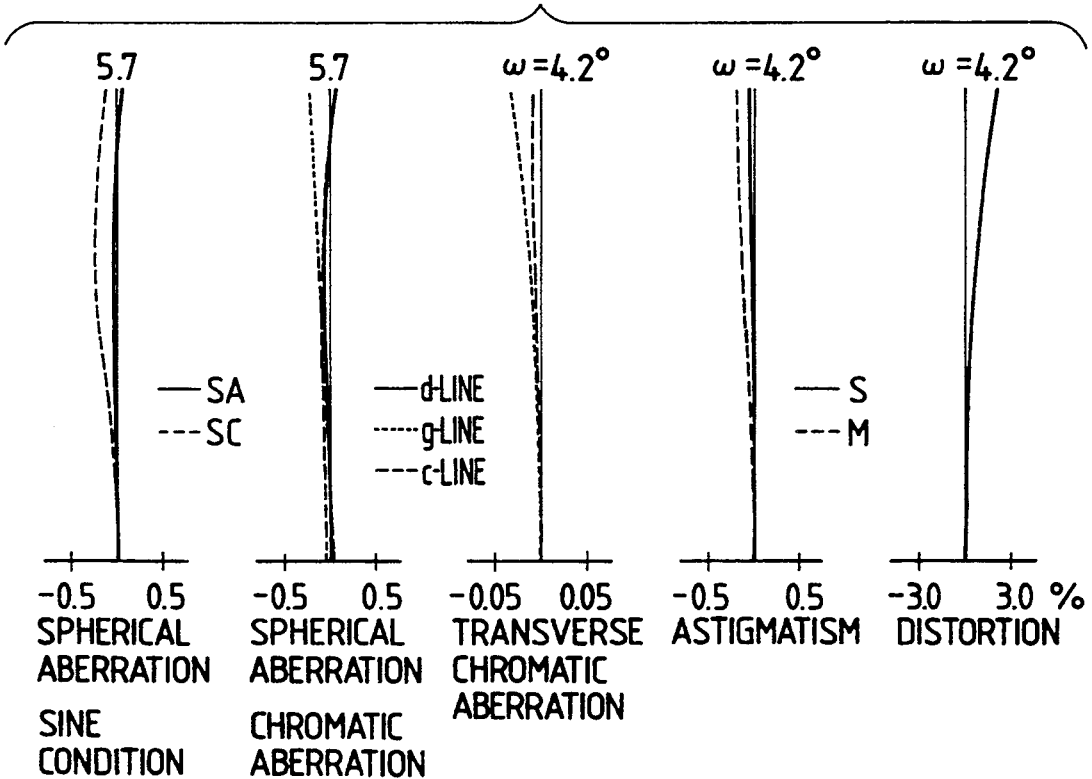
FIG. 28 is still another set of graphs plotting the aberration curves obtained with the zoom lens system of Example 7.

FIG. 25 is a simplified cross-sectional view of the telephoto zoom lens system according to Example 7 at the wide-angle end. Specific data for this example are as shown in Table 13. The various aberration curves obtained with this lens system at the wide-angle end, in the middle-angle portion and at the telephoto end are plotted respectively in FIGS. 26, and 28; the aberrations under consideration are spherical aberration SA, sine condition SC, chromatic aberrations expressed by spherical aberrations at the d-, g- and c-lines, lateral chromatic aberration, astigmatism ( S, sagittal; M, meridional), and distortion.

TABLE 13

| Surface No. | r | d | n | v |
|---|---|---|---|---|
| 1 | 102.942 | 5.75 | 1.56907 | 71.3 |
| 2 | −2238.318 | 0.20 | | |

TABLE 13-continued

| Surface No. | r | d | n | v |
|---|---|---|---|---|
| 3 | 95.490 | 10.31 | 1.43875 | 95.0 |
| 4 | −102.720 | 0.98 | | |
| 5 | −102.802 | 2.40 | 1.84666 | 23.9 |
| 6 | −207.668 | variable | | |
| 7 | 453.000 | 5.10 | 1.80518 | 25.4 |
| 8 | −44.850 | 1.50 | 1.69680 | 55.5 |
| 9 | 51.555 | 4.50 | | |
| 10 | −48.280 | 1.50 | 1.77250 | 49.6 |
| 11 | 237.774 | variable | | |
| 12 | 97.945 | 3.90 | 1.64850 | 53.0 |
| 13 | −112.953 | 0.20 | | |
| 14 | 39.443 | 7.33 | 1.49700 | 81.6 |
| 15 | −90.719 | 0.09 | | |
| 16 | −91.054 | 1.50 | 1.84666 | 23.9 |
| 17 | 374.714 | 49.03 | | |
| 18 | 47.730 | 3.17 | 1.51742 | 52.4 |
| 19 | −2275.000 | 1.80 | | |
| 20 | −34.106 | 1.50 | 1.80610 | 40.9 |
| 21 | 34.106 | 4.74 | 1.78472 | 25.7 |
| 22 | −211.464 | | | |

The values of Fno., f, fB, ω, d5 and d10 vary with zooming as shown in Table 14 below.

TABLE 14

| FNo. | 4.6 | 4.9 | 5.7 |
|---|---|---|---|
| f | 103.01 | 180.00 | 290.00 |
| fB | 47.00 | 51.56 | 66.15 |
| ω | 11.9° | 6.7° | 4.2° |
| d6 | 2.30 | 18.09 | 24.10 |
| d11 | 42.45 | 22.11 | 1.50 |

EXAMPLE 8

Figure 29:
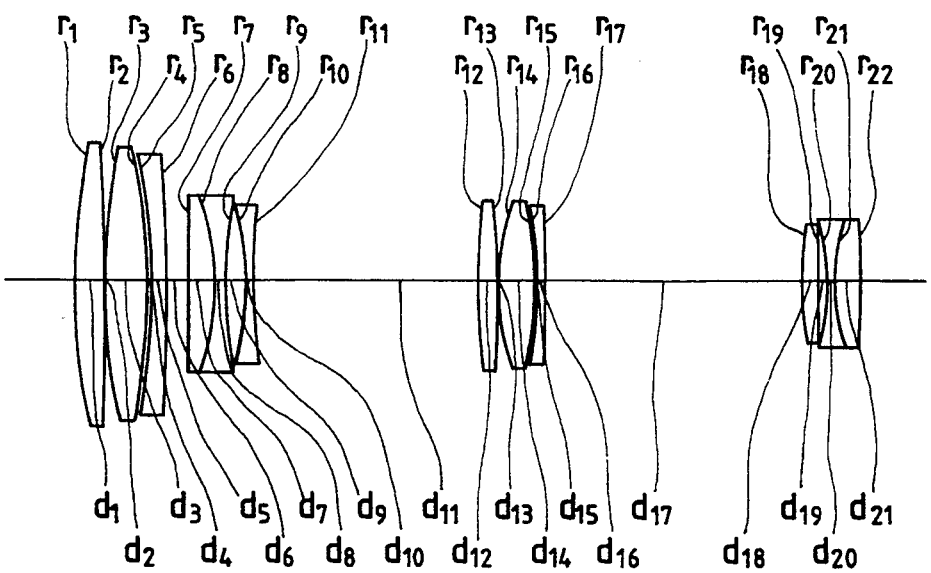
FIG. 29 is a simplified cross-sectional view of the zoom lens system according to Example 8 at the wide-angle end.
Figure 30:
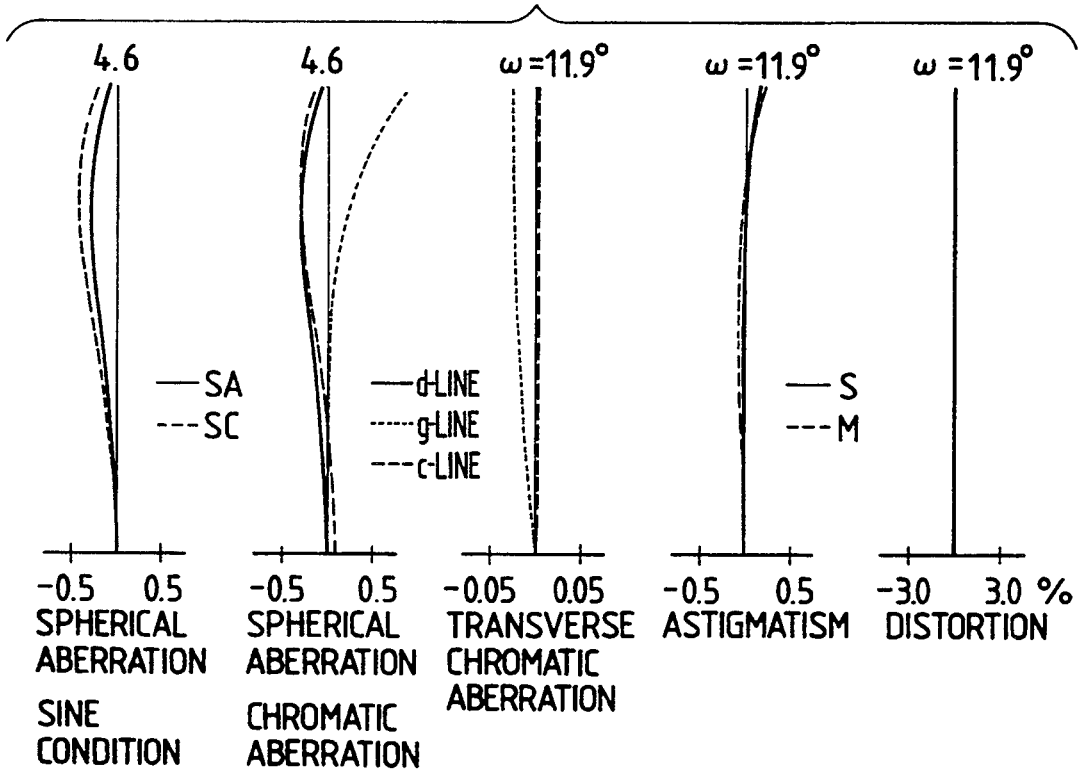
FIG. 30 is a set of graphs plotting the aberration curves obtained with the zoom lens system of Example 8.
Figure 31:
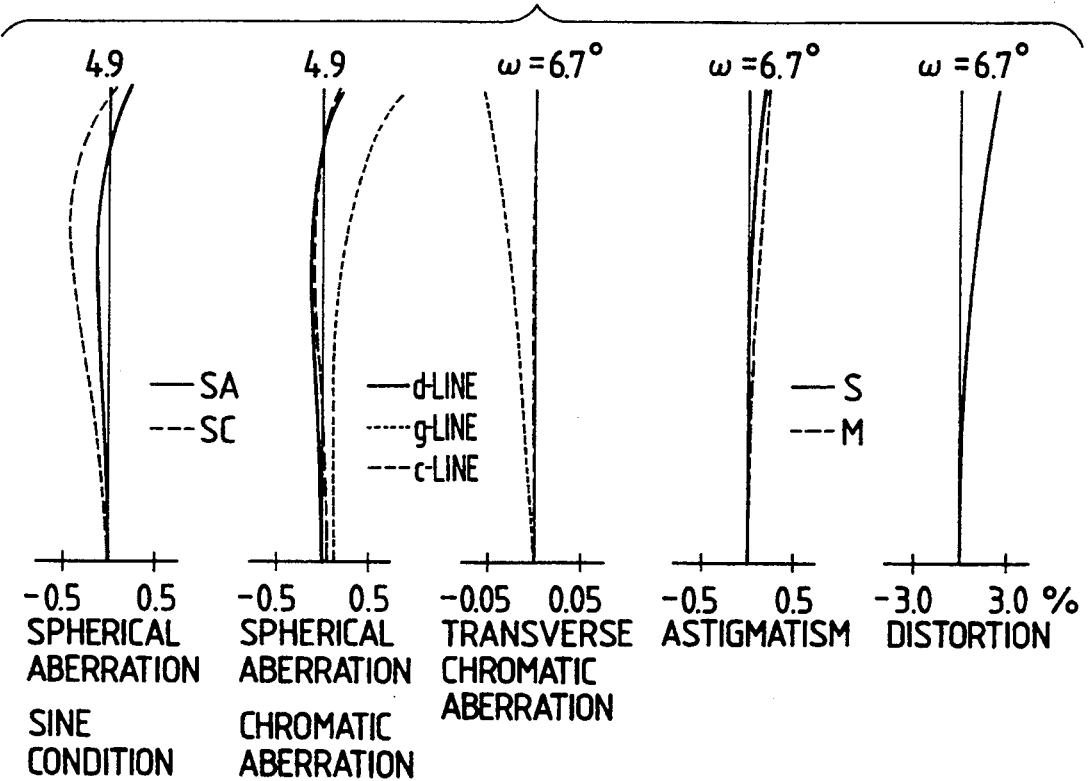
FIG. 31 is another set of graphs plotting the aberration curves obtained with the zoom lens system of Example 8.
Figure 32:
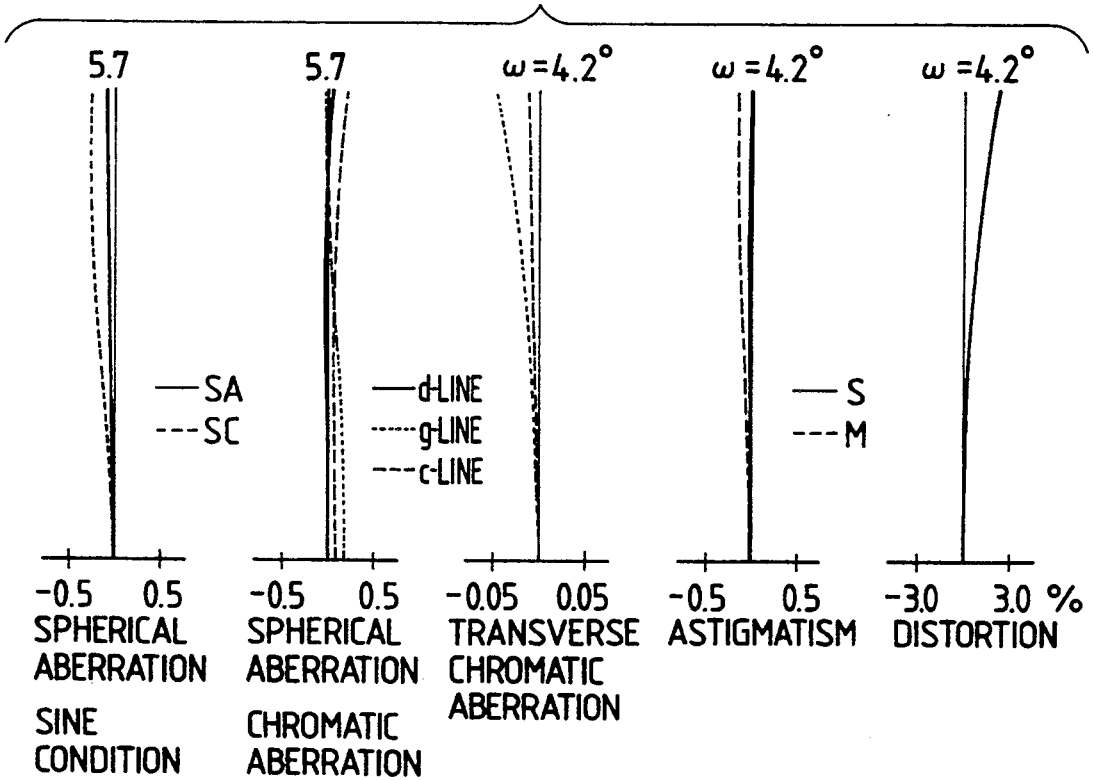
FIG. 32 is still another set of graphs plotting the aberration curves obtained with the zoom lens system of Example 8.

FIG. 29 is a simplified cross-sectional view of the telephoto zoom lens system according to Example 8 at the wide-angle end. Specific data for this example are as shown in Table 15. The various aberration curves obtained with this lens system at the wide-angle end, in the middle angle portion and at the telephoto end are plotted respectively in FIGS. 30, 31 and 32.

TABLE 15

| Surface No. | r | d | n | v |
|---|---|---|---|---|
| 1 | 95.277 | 6.03 | 1.58913 | 61.2 |
| 2 | −775.105 | 0.20 | | |
| 3 | 116.450 | 7.73 | 1.49700 | 81.6 |
| 4 | −116.450 | 0.75 | | |
| 5 | −117.694 | 2.64 | 1.84666 | 23.9 |
| 6 | −412.588 | variable | | |
| 7 | 453.000 | 5.10 | 1.80518 | 25.4 |
| 8 | −44.850 | 1.50 | 1.69680 | 55.5 |
| 9 | 51.555 | 4.50 | | |
| 10 | −48.280 | 1.50 | 1.77250 | 49.6 |
| 11 | 237.774 | variable | | |
| 12 | 99.383 | 3.78 | 1.61800 | 63.4 |
| 13 | −135.348 | 0.20 | | |
| 14 | 40.801 | 6.73 | 1.49700 | 81.6 |
| 15 | −71.340 | 0.65 | | |
| 16 | −69.208 | 1.54 | 1.80518 | 25.4 |
| 17 | −1037.058 | 49.14 | | |
| 18 | 47.730 | 3.17 | 1.51742 | 52.4 |
| 19 | −2275.000 | 1.80 | | |
| 20 | −34.106 | 1.50 | 1.80610 | 40.9 |
| 21 | 34.106 | 4.74 | 1.78472 | 25.7 |
| 22 | −211.464 | | | |

The values of FNO., f, fB, ω, d5 and d10 vary with zooming as shown in Table 16 below.

TABLE 16

| FNo. | 4.6 | 4.9 | 5.7 |
|---|---|---|---|
| f | 103.02 | 180.00 | 290.00 |
| fB | 46.97 | 51.52 | 66.13 |
| ω | 11.9° | 6.7° | 4.2° |
| d6 | 4.08 | 19.88 | 25.88 |
| d11 | 42.45 | 22.11 | 1.49 |

EXAMPLE 9

Figure 33:
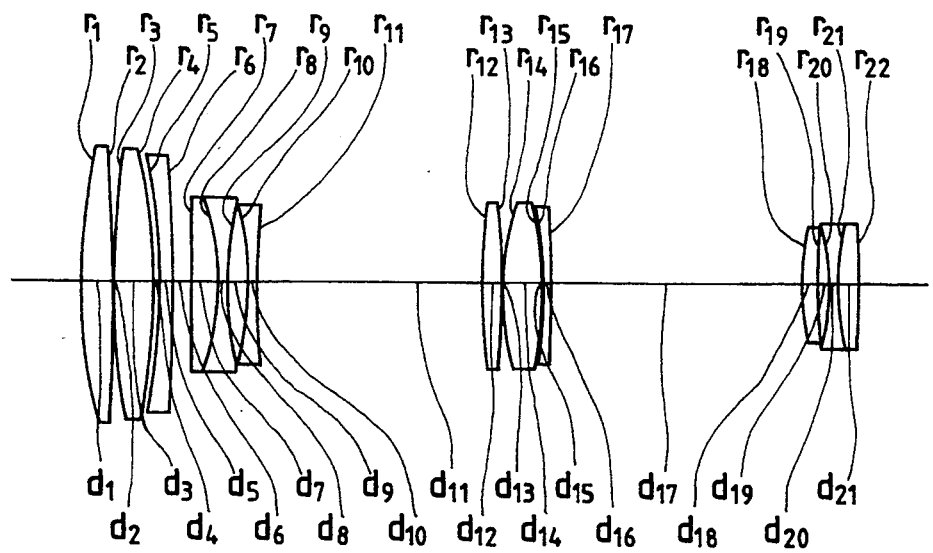
FIG. 33 is a simplified cross-sectional view of the zoom lens system according to Example 9 at the wide-angle end.
Figure 34:
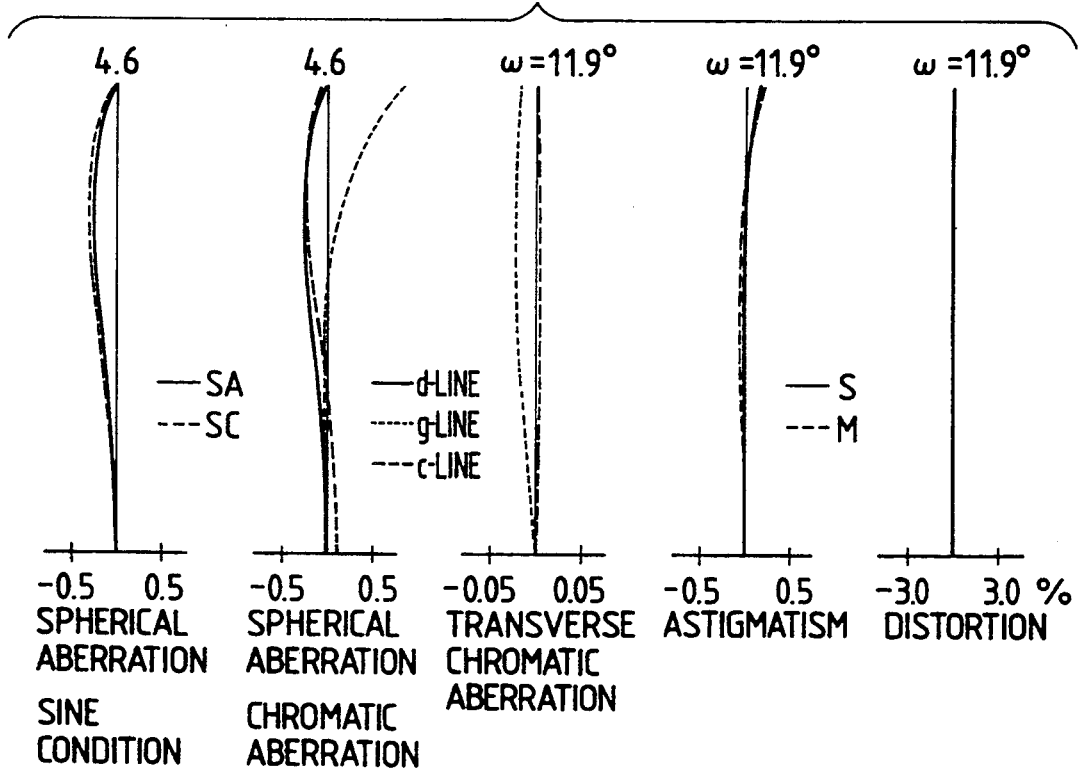
FIG. 34 is a set of graphs plotting the aberration curves obtained with the zoom lens system of Example 9.
Figure 35:
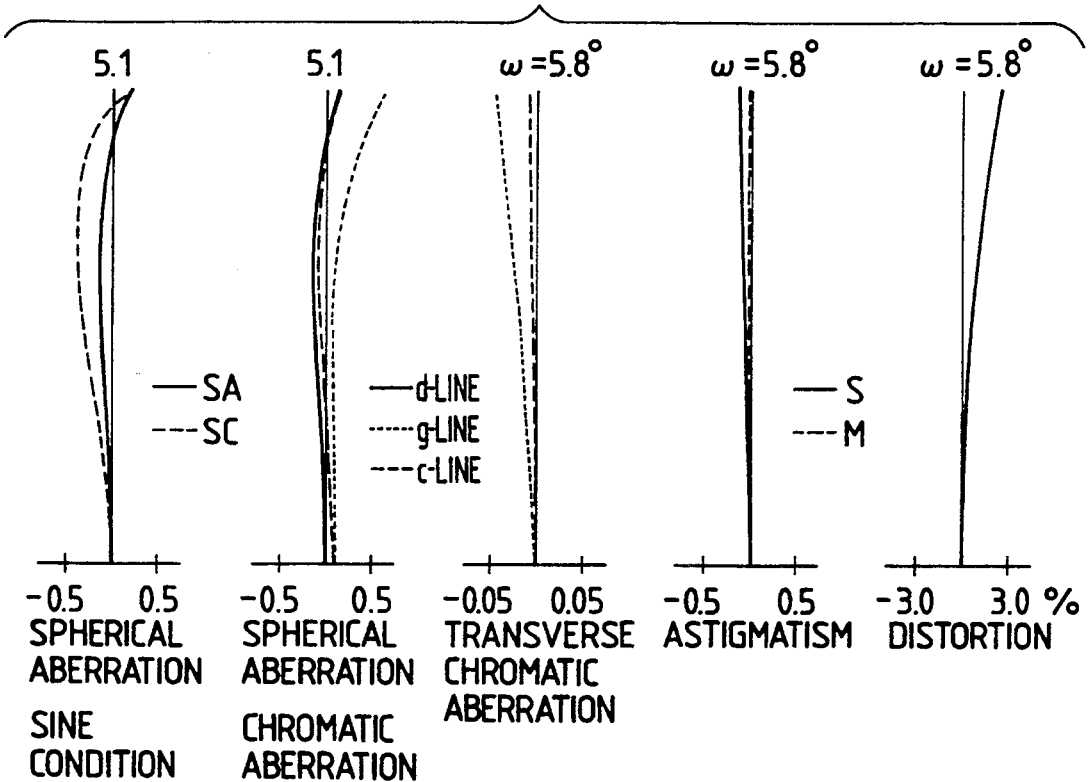
FIG. 35 is another set of graphs plotting the aberration curves obtained with the zoom lens system of Example 9.
Figure 36:
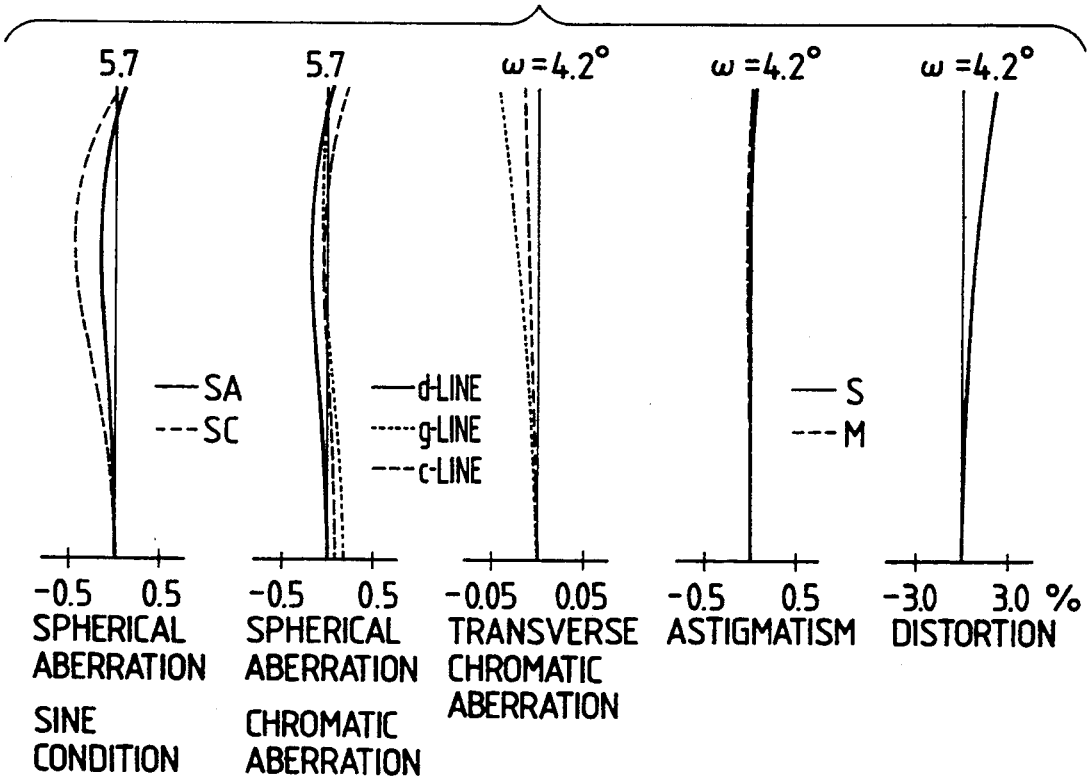
FIG. 36 is still another set of graphs plotting the aberration curves obtained with the zoom lens system of Example 9.

FIG. 33 is a simplified cross-sectional view of the telephoto zoom lens system according to Example 9 at the wide-angle end. Specific data for this example are as shown in Table 17. The various aberration curves obtained with this lens system at the wide-angle end, in the middle-angle portion and at the telephoto end are plotted respectively in FIGS. 34, 35 and 36.

The telephoto zoom lens system of Example 9 is so designed that the distance between sub-groups 3a and 3b of the third lens group is variable with zooming.

TABLE 17

| Surface No. | r | d | n | v |
|---|---|---|---|---|
| 1 | 90.313 | 6.00 | 1.58913 | 61.2 |
| 2 | −593.956 | 0.20 | | |
| 3 | 131.475 | 7.35 | 1.49700 | 81.6 |
| 4 | −119.943 | 1.46 | | |
| 5 | −115.090 | 2.30 | 1.84666 | 23.9 |
| 6 | −407.937 | variable | | |
| 7 | 480.577 | 4.93 | 1.80518 | 25.4 |
| 8 | −45.786 | 1.50 | 1.69680 | 55.5 |
| 9 | 53.186 | 4.43 | | |
| 10 | −48.920 | 1.50 | 1.77250 | 49.6 |
| 11 | 215.808 | variable | | |
| 12 | 97.078 | 3.80 | 1.61800 | 63.4 |
| 13 | −139.717 | 0.20 | | |
| 14 | 41.128 | 6.97 | 1.49700 | 81.6 |
| 15 | −72.166 | 0.64 | | |
| 16 | −70.268 | 1.40 | 1.80518 | 25.4 |
| 17 | −1119.960 | variable | | |
| 18 | 48.422 | 3.00 | 1.51454 | 54.7 |
| 19 | 468.711 | 2.05 | | |
| 20 | −31.838 | 1.50 | 1.80400 | 46.6 |
| 21 | 56.984 | 4.00 | 1.76182 | 26.5 |
| 22 | −104.439 | | | |

The values of FNO., f, fB, ω, d6, d11 and d16 vary with zooming as shown in Table 6 below.

TABLE 18

| FNo. | 4.6 | 5.1 | 5.7 |
|---|---|---|---|
| f | 103.00 | 210.00 | 289.99 |
| fB | 48.56 | 56.41 | 66.00 |
| ω | 11.9° | 5.8° | 4.2° |
| d6 | 3.42 | 21.62 | 25.46 |
| d11 | 42.75 | 15.70 | 1.40 |
| d16 | 48.74 | 49.74 | 50.61 |

The values of the Examples corresponding the conditions are as follows:

TABLE 19

| Conditions | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| fW/f1 | 1.07 | 1.12 | 1.06 | 1.13 | 1.02 | 1.24 | 1.07 | 1.06 | 1.05 |
| m2L | −1.77 | −1.82 | −1.75 | −1.81 | −1.82 | −1.82 | −1.77 | −1.77 | −1.74 |
| m2S | −0.84 | −0.86 | −0.85 | −0.89 | −0.86 | −0.86 | −0.83 | −0.83 | −0.83 |
| m3L | −1.69 | −1.73 | −1.70 | −1.76 | −1.73 | −1.73 | −1.70 | −1.69 | −1.71 |
| m3S | −1.27 | −1.30 | −1.25 | −1.27 | −1.30 | −1.30 | −1.29 | −1.28 | −1.28 |
| Z3/Z2 | 0.63 | 0.63 | 0.65 | 0.68 | 0.63 | 0.63 | 0.63 | 0.62 | 0.63 |
| v1p | 70.2 | 70.2 | 70.2 | 70.2 | 70.2 | 70.2 | 95.0 | 81.6 | 81.6 |
| v3p | 70.2 | 70.2 | 70.2 | 70.2 | 70.2 | 70.2 | 81.6 | 81.6 | 81.6 |

As described on the foregoing pages, the zoom lens system of the present invention adopts an arrangement as simple as a three-group composition and features a constant overall lens length; yet it achieves compactness. Further, the amount by which the first lens group has to be moved to achieve focusing is small enough to facilitate the adoption of automatic focusing. At the same time, the first lens group is fixed during zooming so that it is mechanistically easy to adopt power zooming.

What is claimed is:

1. A zoom lens system consisting of, in order from the object side, first lens group having a positive power, a second lens group having a negative power and a third lens group having a positive power, said first lens group being fixed during zooming, said second and third lens groups being moved along the optical axis as zooming ks effected, said system satisfying the following conditions (a) and (b):

$$0.8 < fW/f1 < 1.25 \quad (a)$$

$$m2L < -1 < m2S \quad (b)$$

where
fW: the focal length of the overall system at the wide-angle end;
$f1$: the focal length of the first lens group;
m2L: the magnification by the second lens group at the telephoto end; and
m2S: the magnification by the second lens group at the wide-angle end.

2. A zoom lens system according to claim I wherein said third lens group satisfies the following condition (c):

$$m3L < -m3S < -1.0 \quad (c)$$

where
m3L = the magnification by the third lens group at the telephoto end; and
m3S: the magnification by the third lens group at the wide-angle end.

3. A zoom lens system according to claim 2 which further satisfies the following condition (d):

$$0.3 < Z3/Z2 < 0.9 \quad (d)$$

where
Z2: the zoom ratio of the second lens group; and
Z3: the zoom ratio of the third lens group.

4. A zoom lens system according to claim 1, satisfying the following condition (e):

$$80 < \nu1p \quad (e)$$

where
$\nu1p$s the greatest value of the Abbe numbers of the positive lenses in the first lens group.

5. A zoom lens System according to claim 1 wherein said third lens group comprises, in order from the object side, a positive first sub-group 3a and a negative second sub-group 3b and satisfies the following condition (f):

$$80 < \nu3p$$

where
$\nu3p$: of the positive lens in the sub-group 3a.

6. A zoom lens system according to claim 1 wherein said third lens group comprises, in order from the object side, a sub-group 3a having a positive power and a sub-group 3b having a negative power, with the dietante between said sub-groups 3a and 3b being varied as zooming is effected.

7. A zoom lens system as claimed in claim 1, which further satisfies the following condition (c):

$$0.3 < z3/z2 < 0.9 \quad (c)$$

where z2 is the zoom ratio of the second lens group; and z3 is the zoom ratio of the third lens group.

8. A zoom lens system comprising, in order from the object side, a first lens group having a positive power, a second lens group having a negative power and a third lens group having a positive power, said first lens group being fixed during zooming, said second and third lens groups being moved along the optical axis as zooming is effected, said system satisfying the following conditions (a) and (b)

$$0.8 < fW/f1 < 1.25 \quad (a)$$

$$m2L < -1 < m2S \quad (b)$$

where
fW is the focal length of the overall system a the wide-angle end;
$f1$ is the focal length of the first lens group;
m2L is the magnification by the second lens group at the telephoto end; and
m2S is the magnification by the second lens group at the wide-angle end;
said third lens group satisfies the following condition (c):

$$m3L < m3S < -1.0 \quad (c)$$

where
m3L is the magnification by the third lens group at the telephoto end; and
m3S is the magnification by the third lens group at the wide-angle end.

9. A zoom lens system comprising, in order from the object side, a first lens group having a positive power, a second lens group having a negative power and a third lens group having a positive power, said first lens group being fixed during zooming, said second and third lens groups being moved along the optical axis as zooming is effected, said system satisfying the following conditions (a), (b) and (c):

$$0.8 < fW/f1 < 1.25$$

$$m2L < -1 < m2S$$

$$80 < \nu1p$$

where $\nu1p$ is the greatest value of the Abbe numbers of the positive lenses in the first lens group,
where fW is the focal length of the overall system a the wide-angle end;
where $f1$ is the focal length of the first lens group;
where m2L is the magnification by the second lens group at the telephoto end; and
m2S is the magnification by the second lens group at the wide-angle end.

10. A zoom lens system comprising, in order from the object side, a first lens group having a positive power, a second lens group having a negative power and a third lens group having a positive power, said first lens group being fixed during zooming, said second and third lens groups being moved along the optical axis as zooming is effected, said system satisfying the following conditions (a) and (b):

$$0.8 < fW/f1 < 1.25 \quad (a)$$

$$m2L < -1 < m2S \quad (b)$$

where
- fW is the focal length of the overall system a the wide-angle end;
- $f1$ is the focal length of the first lens group;
- m2L is the magnification by the second lens group at the telephoto end; and
- m2S is the magnification by the second lens group at the wide-angle end;

said third lens group comprises, in order from the object side, a positive first sub-group 3a and a negative second sub-group 3b and satisfies the following condition (c):

$$80 < v3p \quad (c)$$

where v3p is the Abbe number of the positive lens in the sub-group 3a.

11. A zoom lens system comprising, in order from the object side, a first lens group having a positive power, a second lens group having a negative power and a third lens group having a positive power, said first lens group being fixed during zooming, said second and third lens groups being moved along the optical axis as zooming is effected, said system satisfying the following conditions (a) and (b):

$$0.8 < fW/<1 < 1.25 \quad (a)$$

$$m2L < -1 < m2S \quad (b)$$

where
- fw is the focal length of the overall system a the wide-angle end;
- $f1$ is the focal length of the first lens group;
- m2L is the magnification by the second lens group at the telephoto end; and
- m2S is the magnification by the second lens group at the wide-angle end;

said third lens group comprises, in order from the object side, a sub-group 3a having a positive power and a sub-group 3b having a negative power, with the distance between said sub-groups 3a and 3b being varied as zooming is effected.

* * * * *